US008516988B2

(12) United States Patent
Price

(10) Patent No.: US 8,516,988 B2
(45) Date of Patent: Aug. 27, 2013

(54) VALVE APPARATUS FOR AN INTERNAL COMBUSTION ENGINE

(75) Inventor: Charles E. Price, Mt. Juliet, TN (US)

(73) Assignee: JP Scope, Inc., Mt. Juliet, TN (US)

(*) Notice: Subject to any disclaimer, the term of this patent is extended or adjusted under 35 U.S.C. 154(b) by 23 days.

(21) Appl. No.: 13/365,842

(22) Filed: Feb. 3, 2012

(65) Prior Publication Data

US 2012/0266845 A1    Oct. 25, 2012

Related U.S. Application Data

(63) Continuation of application No. 11/534,508, filed on Sep. 22, 2006, now Pat. No. 8,108,995.

(60) Provisional application No. 60/719,506, filed on Sep. 23, 2005, provisional application No. 60/780,364, filed on Mar. 9, 2006.

(51) Int. Cl.
*F02N 3/00* (2006.01)
*F01L 9/04* (2006.01)

(52) U.S. Cl.
USPC ............... 123/188.4; 123/90.11; 123/90.15

(58) Field of Classification Search
USPC ............ 123/90.11–90.18, 81 R, 81 B, 188.1, 123/188.4, 188.5
See application file for complete search history.

(56) References Cited

U.S. PATENT DOCUMENTS

| 13,905 | A | 12/1855 | Gardiner |
|---|---|---|---|
| 1,123,986 | A | 1/1915 | Bowman et al. |
| 1,161,223 | A | 11/1915 | Koken et al. |
| 1,161,224 | A | 11/1915 | Koken et al. |
| 1,273,002 | A | 7/1918 | Samuels |
| 1,303,748 | A | 5/1919 | Wattel |
| 1,537,248 | A | 5/1925 | Maloney |
| 1,599,430 | A | 9/1926 | Ofeldt |
| 1,612,550 | A | 12/1926 | Tom |
| 1,618,687 | A | 2/1927 | Swanstrom |
| RE16,814 | E | 12/1927 | Farmer et al. |
| 1,818,527 | A | 8/1931 | Becker |
| 1,835,971 | A | 12/1931 | Schattanek |
| 1,877,760 | A | 9/1932 | Berner et al. |
| 1,922,678 | A | 8/1933 | Hallett |

(Continued)

FOREIGN PATENT DOCUMENTS

| CH | 73015 | 8/1916 |
|---|---|---|
| DE | 237263 | 8/1911 |

(Continued)

OTHER PUBLICATIONS

Ralph L. Skinner, "The Development of the Skinner Slide Valve Engine," SAE Technical Paper 47-0178, presented at the SAE Annual Meeting, Jan. 6-10, 1947.

(Continued)

*Primary Examiner* — Noah Kamen
(74) *Attorney, Agent, or Firm* — Cooley LLP

(57) ABSTRACT

A method includes coupling a cylinder head to a cylinder block. A valve member is then moved into a valve pocket defined by the cylinder head such that a first stem portion of the valve member engages an actuator. A first portion of the biasing member is then disposed against a second stem portion of the valve member, the second stem portion being opposite the first stem portion. An end plate is then coupled to the cylinder head such that a second portion of the biasing member engages the end plate.

18 Claims, 25 Drawing Sheets

(56) References Cited

U.S. PATENT DOCUMENTS

| | | |
|---|---|---|
| 2,201,292 A | 5/1940 | Hickey |
| 2,296,081 A | 9/1942 | Aspin |
| 2,302,442 A | 11/1942 | Hickey |
| 2,364,040 A | 11/1944 | Grube |
| 2,409,350 A | 10/1946 | Forrest |
| 2,741,931 A | 4/1956 | Sills |
| 2,770,140 A | 11/1956 | Palumbo |
| 3,198,181 A | 8/1965 | Dolphin |
| 3,633,869 A | 1/1972 | Lehmann |
| 3,709,469 A | 1/1973 | Edmonston et al. |
| 3,788,597 A | 1/1974 | Ichioka |
| 3,855,366 A | 12/1974 | Chapman |
| 3,882,833 A | 5/1975 | Longstaff et al. |
| 3,896,781 A | 7/1975 | Smith |
| 3,937,767 A | 2/1976 | Chapman |
| 4,097,562 A | 6/1978 | Blakeway |
| 4,333,427 A | 6/1982 | Burillo et al. |
| 4,342,294 A | 8/1982 | Hopkins |
| 4,363,302 A | 12/1982 | Pischinger |
| 4,455,543 A | 6/1984 | Pischinger et al. |
| 4,614,170 A | 9/1986 | Pischinger et al. |
| 4,700,684 A | 10/1987 | Pischinger et al. |
| 4,722,315 A | 2/1988 | Pickel |
| 4,765,287 A | 8/1988 | Taylor et al. |
| 4,777,915 A | 10/1988 | Bonvallet |
| 4,815,421 A | 3/1989 | Paul et al. |
| 4,911,115 A | 3/1990 | Boyesen |
| 4,976,227 A | 12/1990 | Draper |
| 5,070,826 A | 12/1991 | Kawamura |
| 5,074,259 A | 12/1991 | Pusic |
| 5,076,221 A | 12/1991 | Kawamura |
| 5,124,598 A | 6/1992 | Kawamura |
| 5,289,802 A | 3/1994 | Paquette et al. |
| 5,329,897 A | 7/1994 | Hemphill et al. |
| 5,398,647 A | 3/1995 | Rivera |
| 5,417,403 A | 5/1995 | Shurman et al. |
| 5,515,818 A | 5/1996 | Born |
| 5,542,385 A | 8/1996 | Kim |
| 5,558,049 A | 9/1996 | Dubose |
| 5,596,966 A | 1/1997 | Elder |
| 5,603,292 A | 2/1997 | Hakansson |
| 5,647,311 A | 7/1997 | Liang et al. |
| 5,655,494 A | 8/1997 | Donaldson, Jr. |
| 5,694,890 A | 12/1997 | Yazdi |
| 5,740,769 A | 4/1998 | Mori |
| 5,839,400 A | 11/1998 | Vattaneo et al. |
| 5,878,707 A | 3/1999 | Ballard |
| 5,967,108 A | 10/1999 | Kutlucinar |
| 6,065,432 A | 5/2000 | Zakharov et al. |
| 6,105,542 A | 8/2000 | Efford |
| 6,205,850 B1 | 3/2001 | Wehrman et al. |
| 6,222,294 B1 | 4/2001 | Stacy et al. |
| 6,257,191 B1 | 7/2001 | Kutlucinar |
| 6,340,010 B1 | 1/2002 | Hara et al. |
| 6,382,193 B1 | 5/2002 | Boyer et al. |
| 6,443,116 B1 | 9/2002 | Dahlborg |
| 6,546,347 B2 | 4/2003 | Batchelor et al. |
| 6,644,255 B1 | 11/2003 | Henry |
| 6,666,197 B2 | 12/2003 | Bayer |
| 6,763,790 B2 | 7/2004 | Watson et al. |
| 6,827,067 B1 | 12/2004 | Yang et al. |
| 6,957,635 B2 | 10/2005 | Katayama |
| 6,968,819 B2 | 11/2005 | Fujii et al. |
| 7,159,556 B2 | 1/2007 | Yoshihara |
| 7,263,963 B2 | 9/2007 | Price |
| 7,373,909 B2 | 5/2008 | Price |
| 7,448,354 B2 | 11/2008 | Price |
| 7,461,619 B2 | 12/2008 | Price |
| 2001/0020693 A1 | 9/2001 | Bischofberger et al. |
| 2002/0124822 A1 | 9/2002 | Cornell et al. |
| 2005/0131618 A1 | 6/2005 | Megli et al. |
| 2005/0205028 A1 | 9/2005 | Lewis et al. |
| 2005/0268880 A1 | 12/2005 | Bidner et al. |
| 2005/0274337 A1 | 12/2005 | Chang |
| 2006/0118087 A1 | 6/2006 | Lewis et al. |
| 2006/0130792 A1 | 6/2006 | Katou et al. |
| 2007/0067988 A1 | 3/2007 | Price |
| 2007/0068470 A1 | 3/2007 | Price |
| 2007/0068471 A1 | 3/2007 | Price |
| 2007/0068494 A1 | 3/2007 | Price |
| 2010/0077973 A1 | 4/2010 | Price et al. |

FOREIGN PATENT DOCUMENTS

| | | |
|---|---|---|
| DE | 648642 | 8/1937 |
| JP | S51-116308 | 9/1976 |
| JP | S55-28731 | 2/1980 |
| JP | S57-18409 | 1/1982 |
| JP | S57-70906 | 5/1982 |
| JP | 57-170756 | 9/1982 |
| JP | S58-128407 | 8/1983 |
| JP | S58-128408 | 8/1983 |
| JP | S58-128409 | 8/1983 |
| JP | S59-74316 | 4/1984 |
| JP | S59-105007 | 7/1984 |
| JP | S60-47810 | 4/1985 |
| JP | S60-112610 | 7/1985 |
| JP | S60-157908 | 10/1985 |
| JP | S60-233304 | 11/1985 |
| JP | S60-233305 | 11/1985 |
| JP | S61-201806 | 9/1986 |
| JP | S62-298610 | 12/1987 |
| JP | S63-100209 | 5/1988 |
| JP | S64-8307 | 1/1989 |
| JP | H02-241915 | 9/1990 |
| JP | H02-137503 | 11/1990 |
| JP | H03-206309 | 9/1991 |
| JP | H04-259613 | 9/1992 |
| JP | H06-022505 | 9/1994 |
| JP | H06-288209 | 10/1994 |
| JP | H06-85971 | 12/1994 |
| JP | H07-29366 | 6/1995 |
| JP | H08-218828 | 8/1996 |
| JP | H09-324630 | 12/1997 |
| JP | H10-280921 | 10/1998 |

OTHER PUBLICATIONS

Eugene P. Batzell, "Slide, Rotary and Piston Valves Versus Poppet Valves for Gas Engine Service," SAE Technical Paper 100016, 1910.

Seiichi Kai, "Development and Progress of the Exhaust-System Device for 2-Stroke Engines," Small Engine Technology Conference and Exposition, Sep. 28-30, 1999, SAE Technical Paper Series 1999-01-3332.

S. Hara, et al., "Application of a Variable Valve Event and Timing System to Automotive Engines," 2000 SAE World Congress, Mar. 6-9, 2000, SAE Technical Paper Series 2000-01-1224.

Peter Kreuter, et al., "Variable Valve Action—Switchable and Continuously Variable Valve Lifts," SAE Technical Paper 2003-01-0026, SAE International, 2003.

M. Sellnau, et al., "2-Step Variable Valve Actuation: System Optimization and Integration on an SI Engine," 2006 SAE World Congress, Apr. 3-6, 2006, SAE Technical Paper Series 2006-01-0040.

International Search Report and Written Opinion for International Application No. PCT/US06/37274 mailed Apr. 16, 2007, 8 pages.

Office Action for U.S. Appl. No. 11/534,494, mailed May 22, 2007.

Office Action for U.S. Appl. No. 11/534,478, mailed May 7, 2007.

Office Action for U.S. Appl. No. 11/534,494, mailed Nov. 26, 2007.

Office Action for U.S. Appl. No. 11/534,508, mailed Jan. 20, 2011.

Final Office Action for U.S. Appl. No. 11/534,508, mailed Jul. 18, 2011.

BMW World—Technology, US Auto Parts® [online] [retrieved on Apr. 28, 2008] Retrieved from the Internet, URL: http://www.usautoparts.net/bmw/technology/valvetronic.htm, pp. 1-4.

AutoSpeed—BMW's Valvetronic! autospeed, [online] [retrieved on Apr. 28, 2008] Retrieved from the Internet, URL: http://www.autospeed.com/cms/article/html?&A=1083, pp. 1-6.

International Search Report and Written Opinion for PCT/US2010/025520, mailed Jun. 7, 2010.

VALVE APPARATUS FOR AN INTERNAL COMBUSTION ENGINE

CROSS-REFERENCE TO RELATED APPLICATIONS

This application is a continuation of U.S. patent application Ser. No. 11/534,508 entitled "Valve Apparatus for an Internal Combustion Engine," filed Sep. 22, 2006 (now U.S. Pat. No. 8,108,995), which claims priority to U.S. Provisional Application Ser. No. 60/719,506 entitled "Side Cam Open Port," filed Sep. 23, 2005 and U.S. Provisional Application Ser. No. 60/780,364 entitled "Side Cam Open Port Engine with Improved Head Valve," filed Mar. 9, 2006, each of which is incorporated herein by reference in its entirety.

This application is related to U.S. patent application Ser. No. 11/534,494 entitled "Valve Apparatus for an Internal Combustion Engine," filed on Sep. 22, 2006, now U.S. Pat. No. 7,373,909, and incorporated herein by reference in its entirety.

This application is also related to U.S. patent application Ser. No. 11/534,478 entitled "Valve Apparatus for an Internal Combustion Engine," filed on Sep. 22, 2006, now U.S. Pat. No. 7,263,963, and incorporated herein by reference in its entirety.

This application is also related to U.S. patent application Ser. No. 11/534,519 entitled "Valve Apparatus for an Internal Combustion Engine," filed on Sep. 22, 2006, now U.S. Pat. No. 7,461,619, and incorporated herein by reference in its entirety.

BACKGROUND

The invention relates generally to an apparatus for controlling gas exchange processes in a fluid processing machine, and more particularly to a valve and cylinder head assembly for an internal combustion engine.

Many fluid processing machines, such as, for example, internal combustion engines, compressors, and the like, require accurate and efficient gas exchange processes to ensure optimal performance For example, during the intake stroke of an internal combustion engine, a predetermined amount of air and fuel must be supplied to the combustion chamber at a predetermined time in the operating cycle of the engine. The combustion chamber then must be sealed during the combustion event to prevent inefficient operation and/or damage to various components in the engine. During the exhaust stroke, the burned gases in the combustion chamber must be efficiently evacuated from the combustion chamber.

Some known internal combustion engines use poppet valves to control the flow of gas into and out of the combustion chamber. Known poppet valves are reciprocating valves that include an elongated stem and a broadened sealing head. In use, known poppet valves open inwardly towards the combustion chamber such that the sealing head is spaced apart from a valve seat, thereby creating a flow path into or out of the combustion chamber when the valve is in the opened position. The sealing head can include an angled surface configured to contact a corresponding surface on the valve seat when the valve is in the closed position to effectively seal the combustion chamber.

The enlarged sealing head of known poppet valves, however, obstructs the flow path of the gas coming into or leaving the combustion cylinder, which can result in inefficiencies in the gas exchange process. Moreover, the enlarged sealing head can also produce vortices and other undesirable turbulence within the incoming air, which can negatively impact the combustion event. To minimize such effects, some known poppet valves are configured to travel a relatively large distance between the closed position and the opened position. Increasing the valve lift, however, results in higher parasitic losses, greater wear on the valve train, greater chance of valve-to-piston contact during engine operation, and the like.

Because the sealing head of known poppet valves extends into the combustion chamber, they are exposed to the extreme pressures and temperatures of engine combustion, which increases the likelihood that the valves will fail or leak. Exposure to combustion conditions can cause, for example, greater thermal expansion, detrimental carbon deposit build-up and the like. Moreover, such an arrangement is not conducive to servicing and/or replacing valves. In many instances, for example, the cylinder head must be removed to service or replace the valves.

Other known internal combustion engines use rotary valves to control the flow of gas into and out of the combustion chamber. Known rotary valve arrangements include a disc or cylinder having one or more openings configured to align with corresponding ports in the cylinder head as the valve continuously rotates, thereby creating a flow path into or out of the combustion chamber. Because such known rotary valves do not extend into the combustion chamber, they address some of the disadvantages of poppet valves addressed above. Because of their continuous rotation, known rotary valves, however, are susceptible to valve leakage. Moreover, because of the continuous nature of operation, the timing of the valve events of known rotary valve engines is not easily varied.

Other known internal combustion engines use slide valves to control the flow of gas into and out of the combustion chamber. Known slide valves are reciprocating valves that include an obstructing portion configured to block the flow path into and/or out of the combustion chamber without any portion of the valve extending into the combustion chamber. While known slide valve arrangements minimize some of the disadvantages associated with poppet valves, they are generally susceptible to valve leakage.

Other slide valves and rotary valves are known for use in fluid flow control assemblies for low-pressure systems. Such assemblies, while potentially useful in controlling the flow of low-pressure liquids, are inadequate for use in high-pressure systems.

Thus, a need exists for an improved valve and cylinder head assembly for an internal combustion engine and like systems and devices.

SUMMARY

Gas exchange valves and methods are described herein. In one embodiment, a method includes coupling a cylinder head to a cylinder block. A valve member is then moved into a valve pocket defined by the cylinder head such that a first stem portion of the valve member engages an actuator. A first portion of the biasing member is then disposed against a second stem portion of the valve member, the second stem portion being opposite the first stem portion. An end plate is then coupled to the cylinder head such that a second portion of the biasing member engages the end plate.

DETAILED DESCRIPTION

In some embodiments, a method includes coupling a cylinder head to a cylinder block. A valve member is then moved into a valve pocket defined by the cylinder head such that a first stem portion of the valve member engages an actuator. A first portion of the biasing member is then disposed against a second stem portion of the valve member, the second stem portion being opposite the first stem portion. An end plate is then coupled to the cylinder head such that a second portion of the biasing member engages the end plate.

In some embodiments, a method includes moving an end plate coupled to a cylinder head to expose a first opening of a valve pocket defined by the cylinder head. A valve spring is then removed from the valve pocket. A valve member is then moved from within the valve pocket through the first opening of the valve pocket without decoupling the cylinder head from an engine block.

Figure 1:
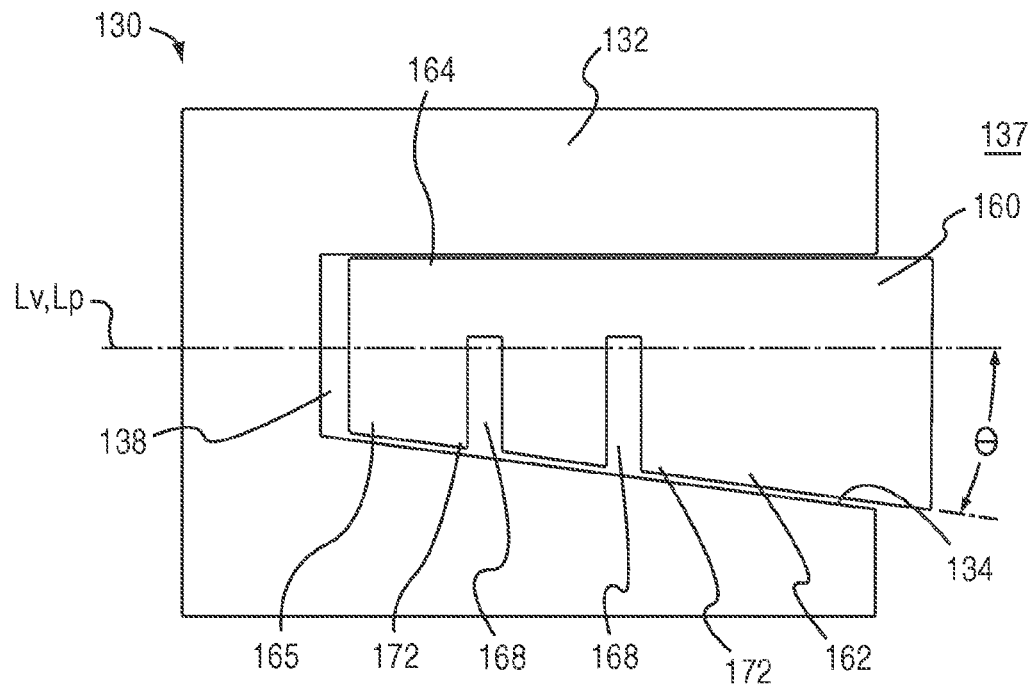
FIGS. 1 and 2 are schematics illustrating a cylinder head assembly according to an embodiment of the invention in a first configuration and a second configuration, respectively.
Figure 2:
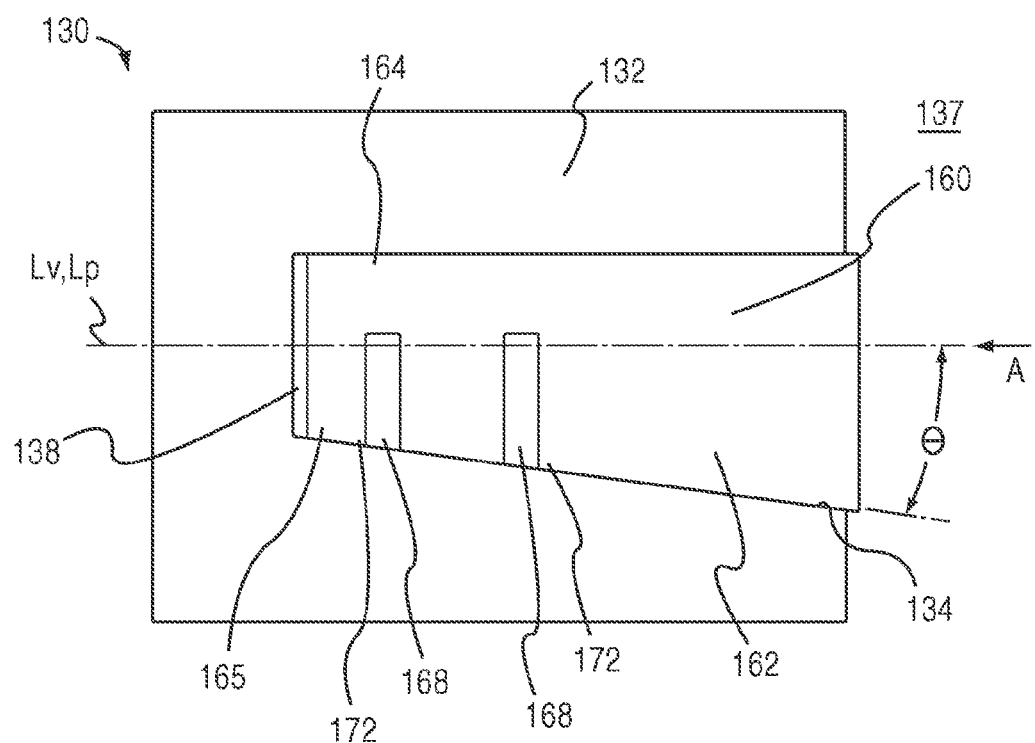

FIGS. 1 and 2 are schematic illustrations of a cylinder head assembly 130 according to an embodiment of the invention in a first and second configuration, respectively. The cylinder head assembly 130 includes a cylinder head 132 and a valve member 160. The cylinder head 132 has an interior surface 134 that defines a valve pocket 138 having a longitudinal axis Lp. The valve member 160 has tapered portion 162 defining two flow passages 168 and having a longitudinal axis Lv. The tapered portion 162 includes two sealing portions 172, each of which is disposed adjacent one of the flow passages 168. The tapered portion 162 includes a first side surface 164 and a second side surface 165. The second side surface 165 of the tapered portion 162 is angularly offset from the longitudinal axis Lv by a taper angle Θ, thereby producing the taper of the tapered portion 162. Although the first side surface 164 is shown as being substantially parallel to the longitudinal axis Lv, thereby resulting in an asymmetrical tapered portion 162, in some embodiments, the first side surface 164 is angularly offset such that the tapered portion 162 is symmetrical about the longitudinal axis Lv. Although the tapered portion 162 is shown as including a linear taper defining the taper angle Θ, in some embodiments the tapered portion 162 can include a non-linear taper.

The valve member 160 is reciprocatably disposed within the valve pocket 138 such that the tapered portion 162 of the valve member 160 can be moved along the longitudinal axis Lv of the tapered portion 162 within the valve pocket 138. In use, the cylinder head assembly 130 can be placed in a first configuration (FIG. 1) and a second configuration (FIG. 2). As illustrated in FIG. 1, when in the first configuration, the valve member 160 is in a first position in which the sealing portions 172 are disposed apart from the interior surface 134 of the cylinder head 132 such that each flow passage 168 is in fluid communication with an area 137 outside of the cylinder head 132. As illustrated in FIG. 2, the cylinder head assembly 132 is placed into the second configuration by moving the valve member 160 inwardly along the longitudinal axis Lv in the direction indicated by the arrow labeled A. When in the second configuration, the sealing portions 172 are in contact with a portion of the interior surface 134 of the cylinder head 132 such that each flow passage 168 is fluidically isolated from the area 137 outside of the cylinder head 132.

Although the entire valve member 160 is shown as being tapered, in some embodiments, only a portion of the valve member is tapered. For example, as will be discussed herein, in some embodiments, a valve member can include one or more non-tapered portions. In other embodiments, a valve member can include multiple tapered portions.

Although the flow passages 168 are shown as being substantially normal to the longitudinal axis Lv of the valve member 160, in some embodiments, the flow passages 168 can be angularly offset from the longitudinal axis Lv. Moreover, in some embodiments, the longitudinal axis Lv of the valve member 160 need not be coincident with the longitudinal axis Lp of the valve pocket 138. For example, in some embodiments, the longitudinal axis of the valve member can be offset from and parallel to the longitudinal axis of the valve pocket. In other embodiments, the longitudinal axis of the valve can be disposed at an angle to the longitudinal axis of the valve pocket.

As illustrated, the longitudinal axis Lv of the tapered portion 162 is coincident with the longitudinal axis of the valve member. Accordingly, throughout the specification, the longitudinal axis of the tapered portion may be referred to as the longitudinal axis of the valve member and vice versa. In some embodiments, however, the longitudinal axis of the tapered portion can be offset from the longitudinal axis of the valve member. For example, in some embodiments, the first stem portion and/or the second stem portion as described below can be angularly offset from the tapered portion such that the longitudinal axis of the valve member is offset from the longitudinal axis of the tapered portion.

Although the cylinder head assembly 130 is illustrated as having a first configuration (i.e., an opened configuration) in which the flow passages 168 are in fluid communication with an area 137 outside of the cylinder head 132 and second configuration (i.e., a closed configuration) in which the flow passages 168 are fluidically isolated from the area 137 outside of the cylinder head 132, in some embodiments the first configuration can be the closed configuration and the second configuration can be the opened configuration. In other embodiments, the cylinder head assembly 130 can have more than two configurations. For example, in some embodiments, a cylinder head assembly can have multiple open configurations, such as, for example, a partially opened configuration and a fully opened configuration.

Figure 3:
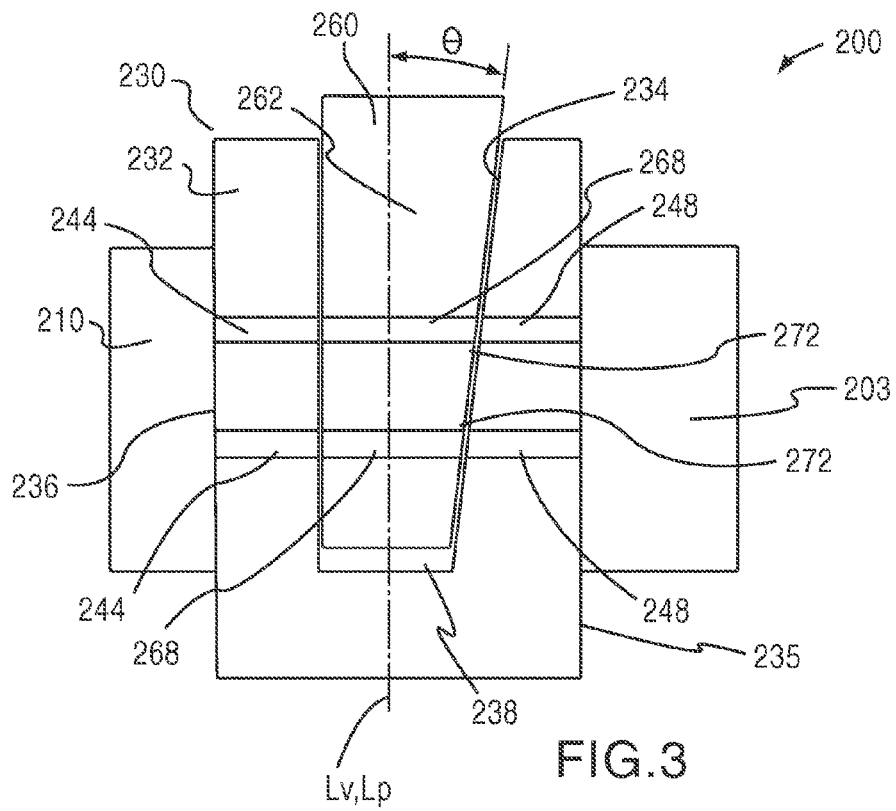
FIGS. 3 and 4 are schematics illustrating a cylinder head assembly according to an embodiment of the invention in a first configuration and a second configuration, respectively.
Figure 4:
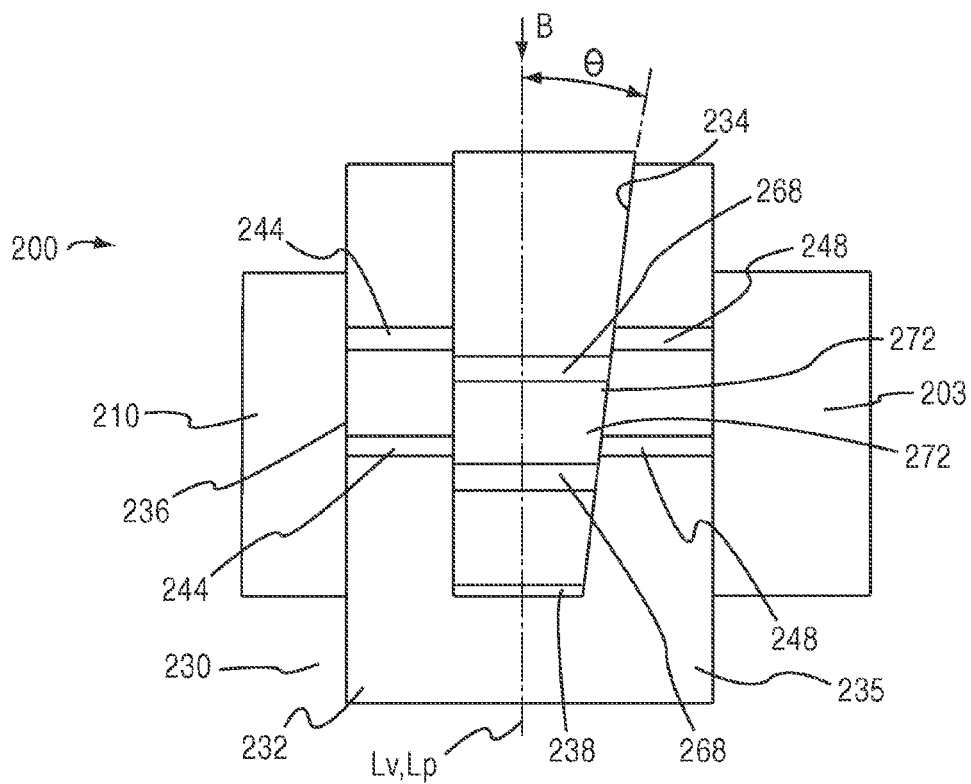

FIGS. 3 and 4 are schematic illustrations of a portion of an engine 200 according to an embodiment of the invention in a first and second configuration, respectively. The engine 200 includes a cylinder head assembly 230, a cylinder 203 and a gas manifold 210. The cylinder 203 is coupled to a first surface 235 of the cylinder head assembly 230 and can be, for example, a combustion cylinder defined by an engine block (not shown). The gas manifold 210 is coupled to a second surface 236 of the cylinder head assembly 230 and can be, for example an intake manifold or an exhaust manifold. Although the first surface 235 and the second surface 236 are shown as being parallel to and disposed on opposite sides of the cylinder head 232 from each other, in other embodiments, the first surface and the second surface can be adjacent each other. In yet other embodiments, the gas manifold and the cylinder can be coupled to the same surface of the cylinder head.

The cylinder head assembly 230 includes a cylinder head 232 and a valve member 260. The cylinder head 232 has an interior surface 234 that defines a valve pocket 238 having a longitudinal axis Lp. The cylinder head 232 also defines two cylinder flow passages 248 and two gas manifold flow passages 244. Each of the cylinder flow passages 248 is in fluid communication with the cylinder 203 and the valve pocket 238. Similarly, each of the gas manifold flow passages 244 is in fluid communication with the gas manifold 210 and the valve pocket 238. Although each of the cylinder flow passages 248 is shown as being fluidically isolated from the other cylinder flow passage 248, in other embodiments, the cylinder flow passages 248 can be in fluid communication with each other. Similarly, although each of the gas manifold flow passages 244 is shown as being fluidically isolated from the other gas manifold flow passage 244, in other embodiments, the gas manifold flow passages 244 can be in fluid communication with each other.

The valve member 260 has a tapered portion 262 having a longitudinal axis Lv and a taper angle $\Theta$ with respect to the longitudinal axis Lv. The tapered portion 262 defines two flow passages 268 and includes two sealing portions 272, each of which is disposed adjacent one of the flow passages 268. Although shown as being an asymmetrical taper in a single dimension, in some embodiments the tapered portion can be symmetrically tapered about the longitudinal axis Lv. In other embodiments, as discussed in more detail herein, the tapered portion can be tapered in two dimensions about the longitudinal axis Lv.

The valve member 260 is disposed within the valve pocket 238 such that the tapered portion 262 of the valve member 260 can be moved along its longitudinal axis Lv within the valve pocket 238. In use, the engine 200 can be placed in a first configuration (FIG. 3) and a second configuration (FIG. 4). As illustrated in FIG. 3, when in the first configuration, the valve member 260 is in a first position in which each flow passage 268 is in fluid communication with one of the cylinder flow passages 248 and one of the gas manifold flow passages 244. In this manner, the gas manifold 210 is in fluid communication with the cylinder 203. Although the flow passages 268 are shown as being aligned with the cylinder flow passages 248 and the gas manifold flow passages 244 when the engine is in the first configuration, in other embodiments the flow passages 268 need not be directly aligned. In other words, the flow passages 268, 248, 24 may be offset when the engine 200 is in the first configuration, but the gas manifold 210 is still in fluid communication with the cylinder 203.

As illustrated in FIG. 4, when the engine 200 is in the second configuration, the valve member 260 is in a second position, axially offset from the first position in the direction indicated by the arrow labeled B. In the second configuration, the sealing portions 272 are in contact with a portion of the interior surface 234 of the cylinder head 232 such that each flow passage 268 is fluidically isolated from the cylinder flow passages 248. In this manner, the cylinder 203 is fluidically isolated from the gas manifold 210.

Figure 5:
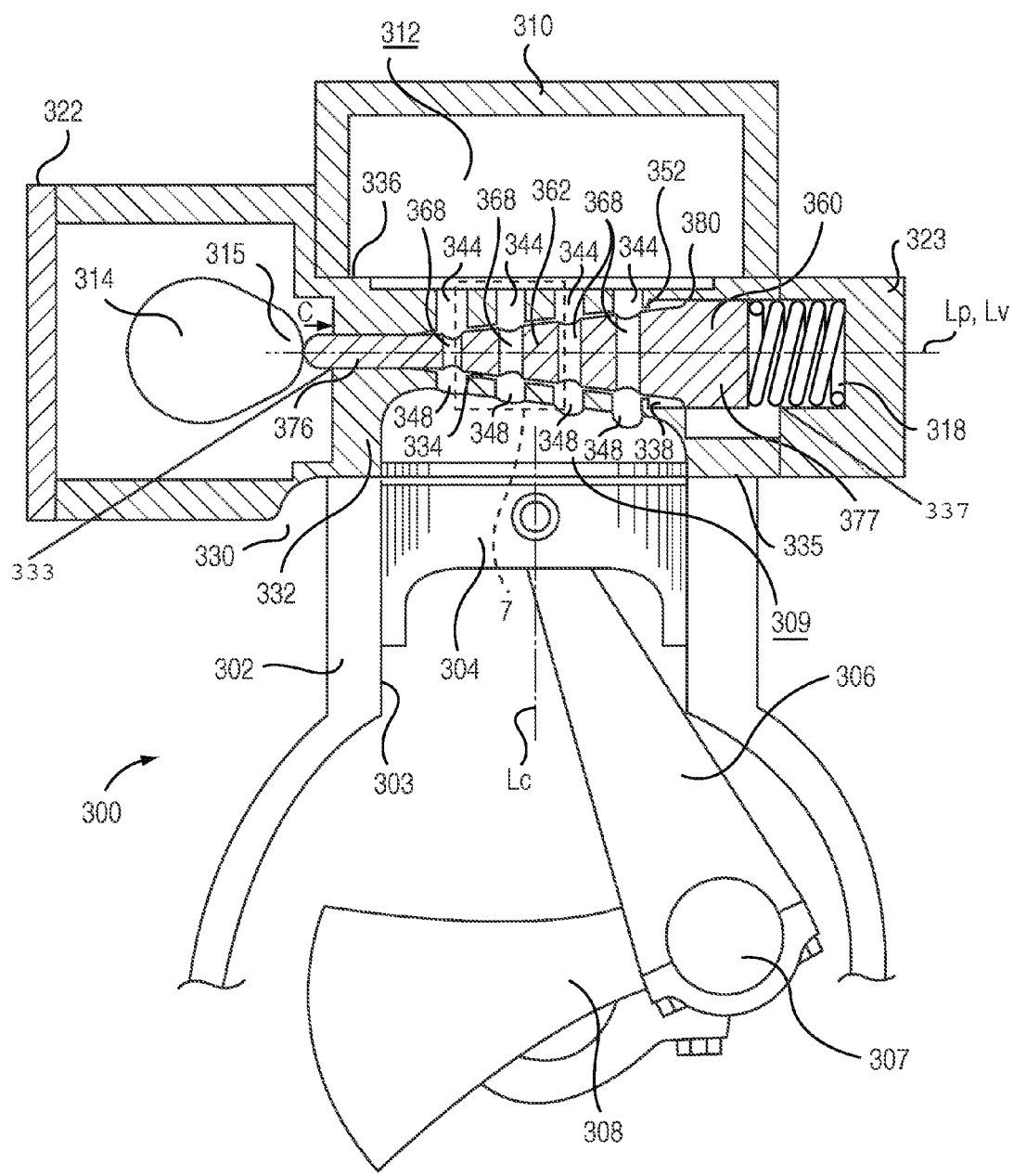
FIG. 5 is a cross-sectional front view of a portion of an engine including a cylinder head assembly according to an embodiment of the invention in a first configuration.
Figure 6:
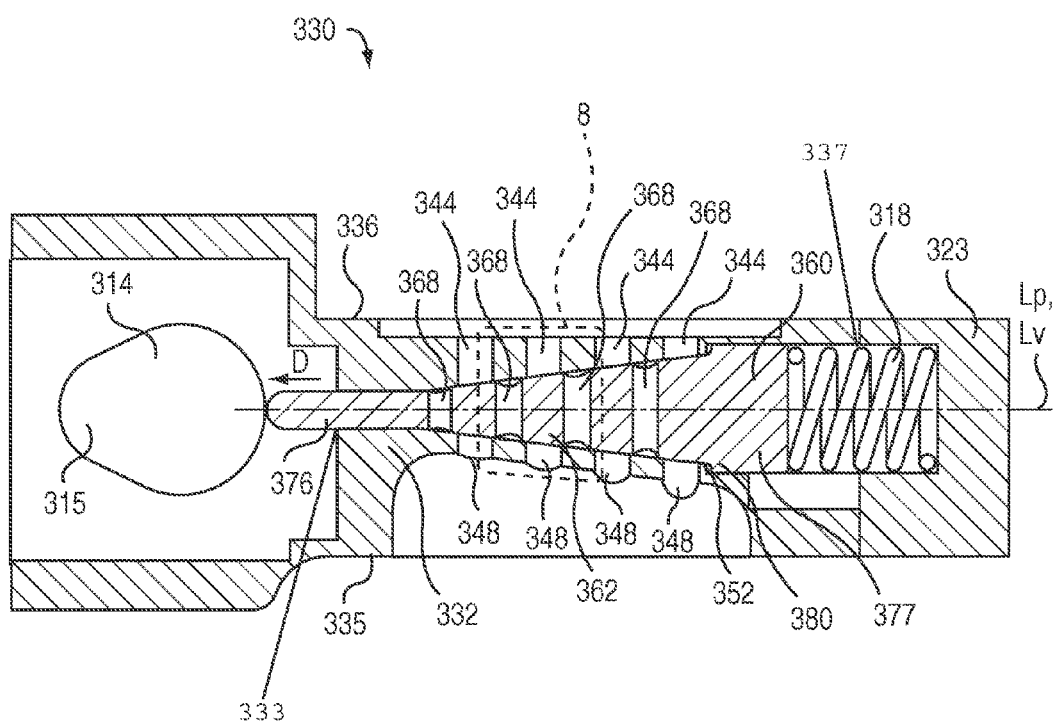
FIG. 6 is a cross-sectional front view of the cylinder head assembly illustrated in FIG. 5 in a second configuration

FIG. 5 is a cross-sectional front view of a portion of an engine 300 including a cylinder head assembly 330 in a first configuration according to an embodiment of the invention. FIG. 6 is a cross-sectional front view of the cylinder head assembly 330 in a second configuration. The engine 300 includes an engine block 302 and a cylinder head assembly 330 coupled to the engine block 302. The engine block 302 defines a cylinder 303 having a longitudinal axis Lc. A piston 304 is disposed within the cylinder 303 such that it can reciprocate along the longitudinal axis Lc of the cylinder 303. The piston 304 is coupled by a connecting rod 306 to a crankshaft 308 having an offset throw 307 such that as the piston reciprocates within the cylinder 303, the crankshaft 308 is rotated about its longitudinal axis (not shown). In this manner, the reciprocating motion of the piston 304 can be converted into a rotational motion.

A first surface 335 of the cylinder head assembly 330 is coupled to the engine block 302 such a portion of the first surface 335 covers the upper portion of the cylinder 303 thereby forming a combustion chamber 309. Although the portion of the first surface 335 covering the cylinder 303 is shown as being curved and angularly offset from the top surface of the piston, in some embodiments, because the cylinder head assembly 330 does not include valves that protrude into the combustion chamber, the surface of the cylinder head assembly forming part of the combustion chamber can have any suitable geometric design. For example, in some embodiments, the surface of the cylinder head assembly forming part of the combustion chamber can be flat and parallel to the top surface of the piston. In other embodiments, the surface of the cylinder head assembly forming part of the combustion chamber can be curved to form a hemispherical combustion chamber, a pent-roof combustion chamber or the like.

A gas manifold 310 defining an interior area 312 is coupled to a second surface 336 of the cylinder head assembly 330 such that the interior area 312 of the gas manifold 310 is in fluid communication with a portion of the second surface 336. As described in detail herein, this arrangement allows a gas, such as, for example air or combustion by-products, to be transported into or out of the cylinder 303 via the cylinder head assembly 330 and the gas manifold 310. Although shown as including a single gas manifold 310, in some embodiments, an engine can include two or more gas manifolds. For example, in some embodiments an engine can include an intake manifold configured to supply air and/or an air-fuel mixture to the cylinder head and an exhaust manifold configured to transport exhaust gases away from the cylinder head.

Moreover, as shown, in some embodiments the first surface 335 can be opposite the second surface 336, such that the flow of gas into and/or out of the cylinder 303 can occur along a substantially straight line. In such an arrangement, a fuel injector (not shown) can be disposed in an intake manifold (not shown) directly above the cylinder flow passages 348. In this manner, the injected fuel can be conveyed into the cylinder 303 without being subjected to a series of bends. Eliminating bends along the fuel path can reduce fuel impingement and/or wall wetting, thereby leading to more efficient engine performance, such as, for example, improved transient response.

Figure 7:
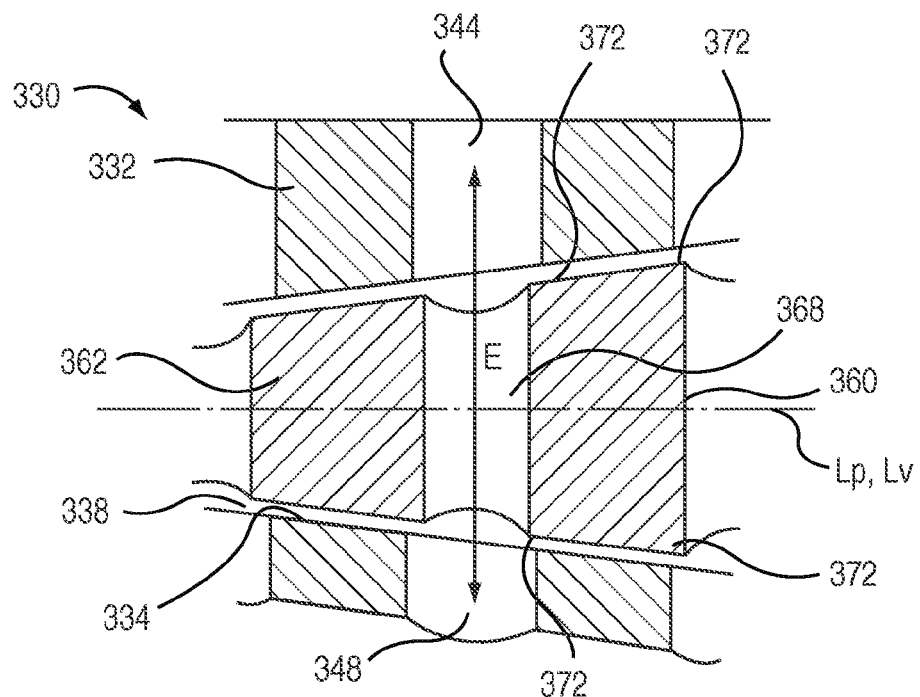
FIG. 7 is a cross-sectional front view of the portion of the cylinder head assembly labeled "7" in FIG. 5.

The cylinder head assembly 330 includes a cylinder head 332 and a valve member 360. The cylinder head 332 has an interior surface 334 that defines a valve pocket 338 having a longitudinal axis Lp. The cylinder head also defines a first opening 333 and a second opening 337. The cylinder head 332 also defines four cylinder flow passages 348 and four gas manifold flow passages 344. Each of the cylinder flow passages 348 is adjacent the first surface 335 of the cylinder head 332 and is in fluid communication with the cylinder 303 and the valve pocket 338. Similarly, each of the gas manifold flow passages 344 is adjacent the second surface 336 of the cylinder head 332 and is in fluid communication with the gas manifold 310 and the valve pocket 338. Each of the cylinder flow passages 348 is aligned with a corresponding gas manifold flow passage 344. In this arrangement, when the cylinder head assembly 330 is in the first (or opened) configuration (see, e.g., FIGS. 5 and 7), the gas manifold 310 is in fluid communication with the cylinder 303. Conversely, when the cylinder head assembly 330 is in a second (or closed) configuration (see, e.g., FIGS. 6 and 8), the gas manifold 310 is fluidically isolated from the cylinder 303.

The valve member 360 has tapered portion 362, a first stem portion 376 and a second stem portion 377. The first stem portion 376 is coupled to an end of the tapered portion 362 of the valve member 360 and is configured to engage a valve lobe 315 of a camshaft 314. The second stem portion 377 is coupled to an end of the tapered portion 362 opposite from the first stem portion 376 and is configured to engage a spring 318. A portion of the spring 318 is contained within an end plate 323, which is removably coupled to the cylinder head 332 such that it compresses the spring 318 against the second stem portion 377 thereby biasing the valve member 360 in a direction indicated by the arrow D in FIG. 6.

The tapered portion 362 of the valve member 360 defines four flow passages 368 therethrough. The tapered portion includes eight sealing portions 372 (see, e.g., FIGS. 10, 11 and 13), each of which is disposed adjacent one of the flow passages 368 and extends continuously around the perimeter of an outer surface 363 of the tapered portion 362. The valve member 360 is disposed within the valve pocket 338 such that the tapered portion 362 of the valve member 360 can be moved along a longitudinal axis Lv of the valve member 360 within the valve pocket 338. In some embodiments, the valve pocket 338 includes a surface 352 configured to engage a corresponding surface 380 on the valve member 360 to limit the range of motion of the valve member 360 within the valve pocket 338.

In use, when the camshaft 314 is rotated such that the eccentric portion of the valve lobe 315 is in contact with the first stem 376 of the valve member 360, the force exerted by the valve lobe 315 on the valve member 360 is sufficient to overcome the force exerted by the spring 318 on the valve member 360. Accordingly, as shown in FIG. 5, the valve member 360 is moved along its longitudinal axis Lv within the valve pocket 338 in the direction of the arrow C, into a first position, thereby placing the cylinder head assembly 330 in the opened configuration. When in the opened configuration, the valve member 360 is positioned within the valve pocket 338 such that each flow passage 368 is aligned with and in fluid communication with one of the cylinder flow passages 348 and one of the gas manifold flow passages 344. In this manner, the gas manifold 310 is in fluid communication with the cylinder 303, along the flow path indicated by the arrow labeled E in FIG. 7.

Figure 8:
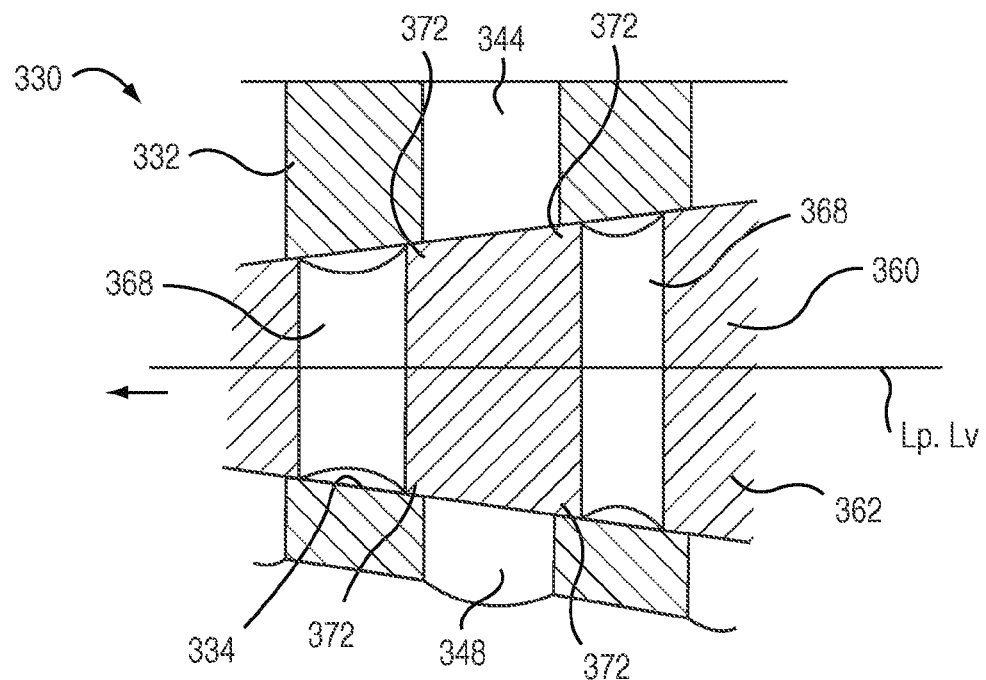
FIG. 8 is a cross-sectional front view of the portion of the cylinder head assembly labeled "8" in FIG. 6.

When the camshaft 314 is rotated such that the eccentric portion of the camshaft lobe 315 is not in contact with the first stem 376 of the valve member 360, the force exerted by the spring 318 is sufficient to move the valve member 360 in the direction of the arrow D, into a second position, axially offset from the first position, thereby placing the cylinder head assembly 330 in the closed configuration (see FIG. 6). When in the closed configuration, each flow passage 368 is offset from the corresponding cylinder flow passage 348 and gas manifold flow passage 344. Moreover, as shown in FIG. 8, when in the closed configuration, each of the sealing portions 372 is in contact with a portion of the interior surface 334 of the cylinder head 332 such that each flow passage 368 is fluidically isolated from the cylinder flow passages 348. In this manner, the cylinder 303 is fluidically isolated from the gas manifold 310.

Although the cylinder head assembly 330 is described as being configured to fluidically isolate the flow passages 368 from the cylinder flow passages 348 when in the closed configuration, in some embodiments, the sealing portions 372 can be configured to contact a portion of the interior surface 334 of the cylinder head 332 such that each flow passage 368 is fluidically isolated from the cylinder head flow passages 348 and the gas manifold flow passages 344. In other embodiments, the sealing portions 372 can be configured to contact a portion of the interior surface 334 of the cylinder head 332 such that each flow passage 368 is fluidically isolated only from the gas manifold flow passages 344.

Although each of the cylinder flow passages 348 is shown being fluidically isolated from the other cylinder flow passage 348, in some embodiments, the cylinder flow passages 348 can be in fluid communication with each other. Similarly, although each of the gas manifold flow passages 344 is shown being fluidically isolated from the other gas manifold flow passages 344, in other embodiments, the gas manifold flow passages 344 can be in fluid communication with each other.

Although the longitudinal axis Lc of the cylinder 303 is shown as being substantially normal to the longitudinal axis Lp of the valve pocket 338 and the longitudinal axis Lv of the valve 360, in some embodiments, the longitudinal axis of the cylinder can be offset from the longitudinal axis of the valve pocket and/or the longitudinal axis of the valve member by an angle other than 90 degrees. In yet other embodiments, the longitudinal axis of the cylinder can be substantially parallel to the longitudinal axis of the valve pocket and/or the longitudinal axis of the valve member. Similarly, as described above, the longitudinal axis Lv of the valve member 360 need not be coincident with or parallel to the longitudinal axis Lp of the valve pocket 338.

In some embodiments, the camshaft 314 is disposed within a portion of the cylinder head 332. An end plate 322 is removably coupled to the cylinder head 332 to allow access to the camshaft 314 and the first stem portion 376 for assembly, repair and/or adjustment. In other embodiments, the camshaft is disposed within a separate cam box (not shown) that is removably coupled to the cylinder head. Similarly, the end plate 323 is removably coupled to the cylinder head 332 to allow access to the spring 318 and/or the valve member 360 for assembly, repair, replacement and/or adjustment.

In some embodiments, the spring 318 is a coil spring configured to exert a force on the valve member 360 thereby ensuring that the sealing portions 372 remain in contact with the interior surface 334 when the cylinder head assembly 330 is in the closed configuration. The spring 318 can be constructed from any suitable material, such as, for example, a stainless steel spring wire, and can be fabricated to produce a suitable biasing force. In some embodiments, however, a cylinder head assembly can include any suitable biasing member to ensure that that the sealing portions 372 remain in contact with the interior surface 334 when the cylinder head assembly 330 is in the closed configuration. For example, in some embodiments, a cylinder head assembly can include a cantilever spring, a Belleville spring, a leaf spring and the like. In other embodiments, a cylinder head assembly can include an elastic member configured to exert a biasing force on the valve member. In yet other embodiments, a cylinder head assembly can include an actuator, such as a pneumatic actuator, a hydraulic actuator, an electronic actuator and/or the like, configured to exert a biasing force on the valve member.

Although the first stem portion 376 is shown and described as being in direct contact with the valve lobe 315 of the camshaft 314, in some embodiments, an engine and/or cylinder head assembly can include a member configured to maintain a predetermined valve lash setting, such as for example, an adjustable tappet, disposed between the camshaft and the first stem portion. In other embodiments, an engine and/or cylinder head assembly can include a hydraulic lifter disposed between the camshaft and the first stem portion to ensure that the valve member is in constant contact with the camshaft. In yet other embodiments, an engine and/or a cylinder head assembly can include a follower member, such as for example, a roller follower disposed between the first stem portion. Similarly, in some embodiments, an engine can include one or more components disposed adjacent the spring. For example, in some embodiments, the second stem portion can include a spring retainer, such as for example, a pocket, a clip, or the like. In other embodiments, a valve rotator can be disposed adjacent the spring.

Although the cylinder head 332 is shown and described as being a separate component coupled to the engine block 302, in some embodiments, the cylinder head 332 and the engine block 302 can be monolithically fabricated, thereby eliminating the need for a cylinder head gasket and cylinder head mounting bolts. In some embodiments, for example, the engine block and the cylinder head can be cast using a single mold and subsequently machined to include the cylinders, valve pockets and the like. Moreover, as described above, the valve members can be installed and/or serviced by removing the end plate.

Although the engine 300 is shown and described as including a single cylinder, in some embodiments, an engine can include any number of cylinders in any arrangement. For example, in some embodiments, an engine can include any number of cylinders in an in-line arrangement. In other embodiments, any number of cylinders can be arranged in a vee configuration, an opposed configuration or a radial configuration.

Similarly, the engine 300 can employ any suitable thermodynamic cycle. Such engine types can include, for example, Diesel engines, spark ignition engines, homogeneous charge compression ignition (HCCI) engines, two-stroke engines and/or four stroke engines. Moreover, the engine 300 can include any suitable type of fuel injection system, such as, for example, multi-port fuel injection, direct injection into the cylinder, carburetion, and the like.

Although the cylinder head assembly 330 is shown and described above as being devoid of mounting holes, a spark plug, and the like, in some embodiments, a cylinder head assembly includes mounting holes, spark plugs, cooling passages, oil drillings and the like.

Figure 9:
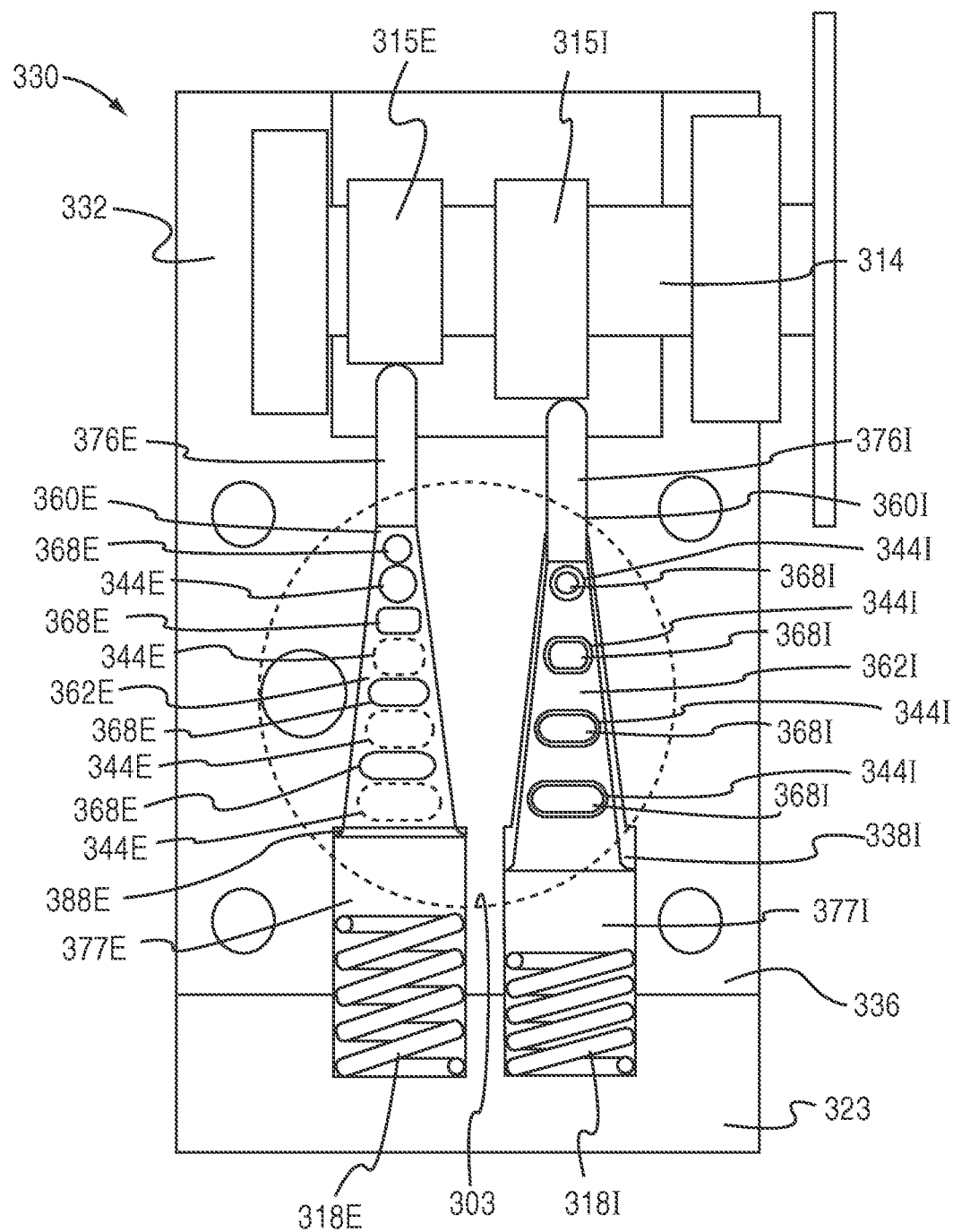
FIG. 9 is a top view of a portion of cylinder head assembly according to an embodiment of the invention.

Although the cylinder head assembly 330 is shown and described above with reference to a single valve 360 and a single gas manifold 310, in some embodiments, a cylinder head assembly includes multiple valves and gas manifolds. For example, FIG. 9 illustrates a top view of the cylinder head assembly 330 including an intake valve member 360I and an exhaust valve member 360E. As illustrated, the cylinder head 332 defines an intake valve pocket 338I, within which the intake valve member 360I is disposed, and an exhaust valve pocket 338E, within which the exhaust valve member 360E is disposed. Similar to the arrangement described above, the cylinder head 332 also defines four intake manifold flow passages 344I, four exhaust manifold flow passages 344E and the corresponding cylinder flow passages (not shown in FIG. 9). Each of the intake manifold flow passages 344I is adjacent the second surface 336 of the cylinder head 332 and is in fluid communication with an intake manifold (not shown) and the intake valve pocket 338I. Similarly, each of the exhaust manifold flow passages 344E is adjacent the second surface 336 of the cylinder head 332 and is in fluid communication with an exhaust manifold (not shown) and the exhaust valve pocket 338E.

The operation of the intake valve member 360I and the exhaust valve member 360E is similar to that of the valve member 360 described above in that each has a first (or opened) position and a second (or closed) position. In FIG. 9, the intake valve member 360I is shown in the opened position, in which each flow passage 368I defined by the tapered portion 362I of the intake valve member 360I is aligned with its corresponding intake manifold flow passage 344I and cylinder flow passage (not shown). In this manner, the intake manifold (not shown) is in fluid communication with the cylinder 303, thereby allowing a charge of air to be conveyed from the intake manifold into the cylinder 303. Conversely, the exhaust valve member 360E is shown in the closed position in which each flow passage 368E defined by the tapered portion 362E of the exhaust valve member 360E is offset from its corresponding exhaust manifold flow passage 344E and cylinder flow passage (not shown). Moreover, each sealing portion (not shown in FIG. 9) defined by the exhaust valve member 360E is in contact with a portion of the interior surface of the exhaust valve pocket 338E such that each flow passage 368E is fluidically isolated from the cylinder flow passages (not shown). In this manner, the cylinder 303 is fluidically isolated from the exhaust manifold (not shown).

The cylinder head assembly 330 can have many different configurations corresponding to the various combinations of the positions of the valve members 360I, 360E as they move between their respective first and second positions. One possible configuration includes an intake configuration in which, as shown in FIG. 9, the intake valve member 360I is in the opened position and the exhaust valve member 360E is in the closed position. Another possible configuration includes a combustion configuration in which both valves are in their closed positions. Yet another possible configuration includes an exhaust configuration in which the intake valve member 360I is in the closed position and the exhaust valve member 360E is in the opened position. Yet another possible configuration is an overlap configuration in which both valves are in their opened positions.

Similar to the operation described above, the intake valve member 360I and the exhaust valve member 360E are moved by a camshaft 314 that includes an intake valve lobe 315I and an exhaust valve lobe 315E. As shown, the intake valve member 360I and the exhaust valve member 360E are each biased in the closed position by springs 318I, 318E, respectively. Although the intake valve lobe 315I and the exhaust valve lobe 315E are illustrated as being disposed on a single camshaft 314, in some embodiments, an engine can include separate camshafts to move the intake and exhaust valve members. In other embodiments, as discussed herein, the intake valve member 360I and/or the exhaust valve member 360E can be moved by an suitable means, such as, for example, an electronic solenoid, a stepper motor, a hydraulic actuator, a pneumatic actuator, a piezo-electric actuator or the like. In yet other embodiments, the intake valve member 360I and/or the exhaust valve member 360E are not maintained in the closed position by a spring, but rather include mechanisms similar to those described above for moving the valve. For example, in some embodiments, a first stem of a valve member can engage a camshaft valve lobe and the second stem of the valve member can engage a solenoid configured to bias the valve member.

FIGS. 10-13 show a top view, a front view, a side cross-sectional view and a perspective view of the valve member 360, respectively. As described above, the valve member has tapered portion 362, a first stem portion 376 and a second stem portion 377. The tapered portion 362 of the valve member 360 defines four flow passages 368. Each flow passage 368 extends through the tapered portion 362 and includes a first opening 369 and a second opening 370. In the illustrated embodiment, the flow passages 368 are spaced apart by a distance S along the longitudinal axis Lv of the tapered portion 362. The distance S corresponds to the distance that the tapered portion 362 moves within the valve pocket 338 when transitioning from the first (opened configuration) to the second (closed) configuration. Accordingly, the travel (or stroke) of the valve member can be reduced by spacing the flow passages 368 closer together. In some embodiments, the distance S can be between 2.3 mm and 4.2 mm (0.090 in. and 0.166 in.). In other embodiments, the distance S can be less than 2.3 mm (0.090 in.) or greater than 4.2 mm (0.166 in.).

Although illustrated as having a constant spacing S, in some embodiments, the flow passages are each separated by a different distance. As discussed in more detail herein, reducing the stroke of the valve member can result in several improvements in engine performance, such as, for example, reduced parasitic losses, allowing the use of weaker valve springs, and the like.

Although the tapered portion 362 is shown as defining four flow passages having a long, narrow shape, in some embodiments a valve member can define any number of flow passages having any suitable shape and size. For example, in some embodiments, a valve member can include eight flow passages configured to have approximately the same cumulative flow area (as taken along a plane normal to the longitudinal axis Lf of the flow passages) as that of a valve member having four larger flow passages. In such an embodiment, the flow passages can be arranged such that the spacing between the flow passages of the "eight passage valve member" is approximately half that of the of the spacing between the flow passages of the "four passage valve member." As such, the stroke of the "eight passage valve member" is approximately half that of the "four passage valve member," thereby resulting in an arrangement that provides substantially the same flow area while requiring the valve member to move only approximately half the distance.

Each flow passage 368 need not have the same shape and/or size as the other flow passages 368. Rather, as shown, the size of the flow passages can decrease with the taper of the tapered portion 362 of the valve member 360. In this manner, the valve member 360 can be configured to maximize the cumulative flow area, thereby resulting in more efficient engine operation. Moreover, in some embodiments, the shape and/or size of the flow passages 368 can vary along the longitudinal axis Lf. For example, in some embodiments, the flow passages can have a lead-in chamfer or taper along the longitudinal axis Lf.

Similarly, each of the manifold flow passages 344 and each of the cylinder flow passages 348 need not have the same shape and/or size as the other manifold flow passages 344 and each of the cylinder flow passages 348, respectively. Moreover, in some embodiments, the shape and/or size of the manifold flow passages 344 and/or the cylinder flow passages 348 can vary along their respective longitudinal axes. For example, in some embodiments, the manifold flow passages can have a lead in chamfer or taper along their longitudinal axes. In other embodiments, the cylinder flow passages can have a lead-in chamfer or taper along their longitudinal axes.

Figure 12:
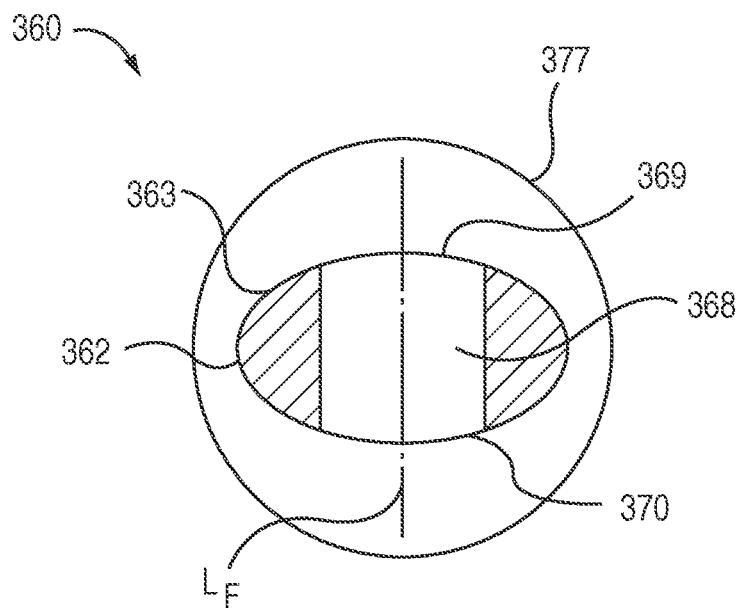
FIG. 12 is a cross-sectional view of the valve member illustrated in FIG. 11 taken along line 12-12.

Although the longitudinal axis Lf of the flow passages 368 is shown in FIG. 12 as being substantially normal to the longitudinal axis Lv of the valve member 360, in some embodiments the longitudinal axis Lf of the flow passages 368 can be angularly offset from the longitudinal axis Lv of the valve member 360 by an angle other than 90 degrees. Moreover, as discussed in more detail herein, in some embodiments, the longitudinal axis and/or the centerline of one flow passage need not be parallel to the longitudinal axis of another flow passage.

Figure 37:
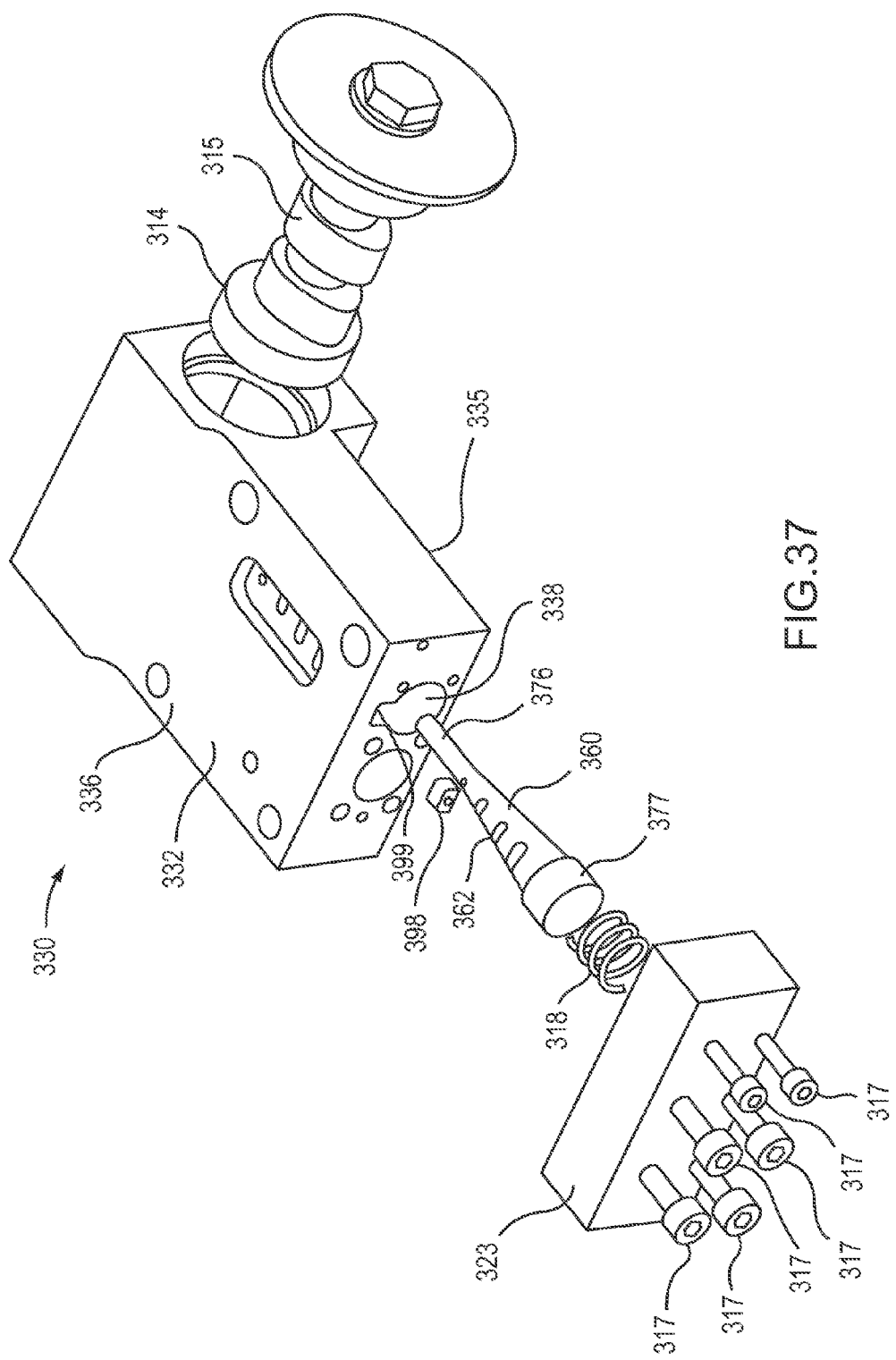
FIG. 37 is a perspective exploded view of the cylinder head assembly shown in FIG. 5.

As previously discussed with reference to FIG. 5, the valve member 360 includes a surface 380 configured to engage a corresponding surface 352 within the valve pocket 338 to limit the range of motion of the valve member 360 within the valve pocket 338. Although the surface 380 is illustrated as being a shoulder-like surface disposed adjacent the second stem portion 377, in some embodiments, the surface 380 can have any suitable geometry and can be disposed anywhere along the valve member 360. For example, in some embodiments, a valve member can have a surface disposed on the first stem portion, the surface being configured to limit the longitudinal motion of the valve member. In other embodiments, a valve member can have a flattened surface disposed on one of the stem portions, the flattened surface being configured to limit the rotational motion of the valve member. In yet other embodiments, as illustrated in FIG. 37, the valve member 360 can be aligned using an alignment key 398 configured to be disposed within a mating keyway 399.

Figure 10:
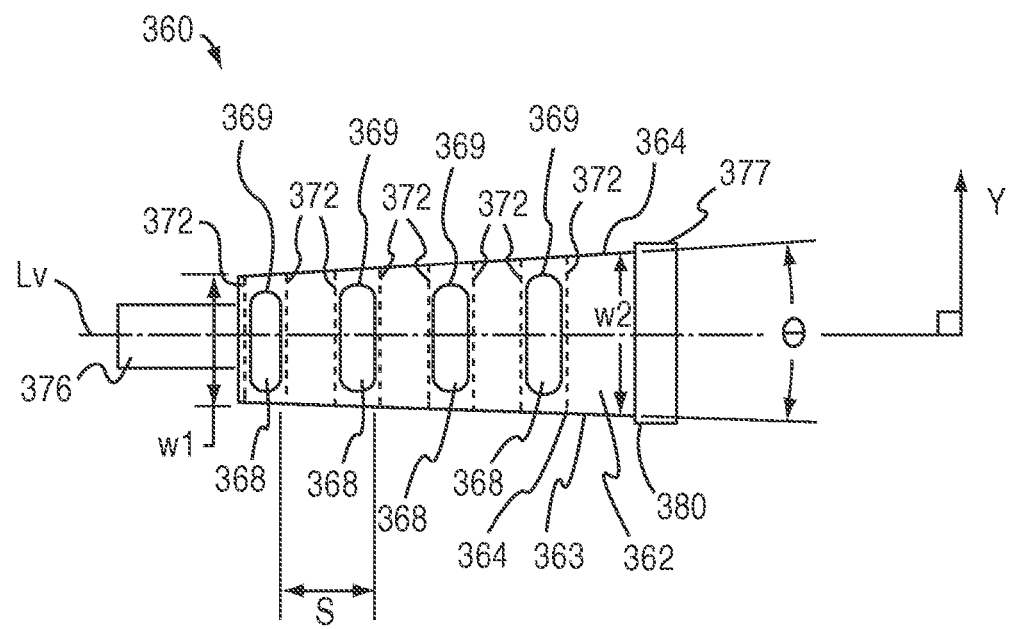
FIGS. 10 and 11 are top and front views, respectively, of the valve member illustrated in FIG. 5.
Figure 11:
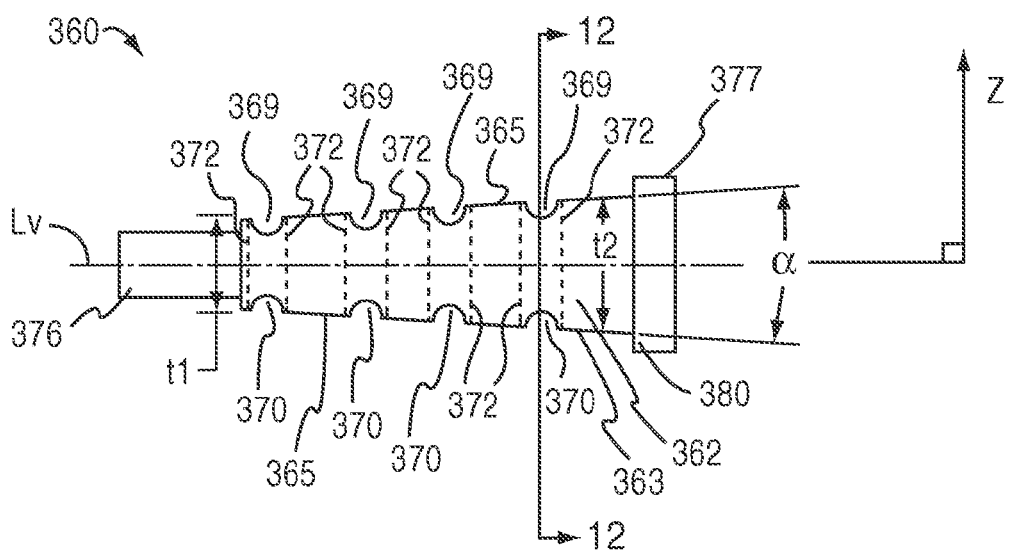

As shown in FIG. 10, which illustrates a top view of the valve member 360, the first opposing side surfaces 364 of the tapered portion 362 are angularly offset from each other by a first taper angle Θ. Similarly, as shown in FIG. 11, which presents a front view of the valve member 360, the second opposing side surfaces 365 of the tapered portion 362 are angularly offset from each other by an angle α. In this manner, the tapered portion 362 of the valve member 360 is tapered in two dimensions.

Said another way, the tapered portion 362 of the valve member 360 has a width W measured along a first axis Y that is normal to the longitudinal axis Lv. Similarly, the tapered portion 362 has a thickness T (not to be confused with the wall thickness of any portion of the valve member) measured along a second axis Z that is normal to both the longitudinal axis Lv and the first axis Y. The tapered portion 362 has a two-dimensional taper characterized by a linear change in the width W and a linear change in the thickness T. As shown in FIG. 10, the width of the tapered portion 362 increases from a value of W1 at one end of the tapered portion 362 to a value of W2 at the opposite end of the tapered portion 362. The change in width along the longitudinal axis Lv defines the first taper angle Θ. Similarly, as illustrated in FIG. 11, the thickness of the tapered portion 362 increases from a value of T1 at one end of the tapered portion 362 to a value of T2 at the opposite end of the tapered portion 362. The change in thickness along the longitudinal axis Lv defines the second taper angle α.

In the illustrated embodiment, the first taper angle Θ and the second taper angle α are each between 2 and 10 degrees. In some embodiments, the first taper angle Θ is the same as the second taper angle α. In other embodiments, the first taper angle Θ is different from the second taper angle α. Selection of the taper angles can affect the size of the valve member and the nature of the seal formed by the sealing portions 372 and the interior surface 334 of the cylinder head 332. In some embodiments, for example, the taper angles Θ, α can be as high as 90 degrees. In other embodiments, the taper angles Θ, α can be as low as 1 degree. In yet other embodiments, as discussed in more detail herein, a valve member can be devoid of a tapered portion (i.e., a taper angle of zero degrees).

Although the tapered portion 362 is shown and described as having a single, linear taper, in some embodiments a valve member can include a tapered portion having a curved taper. In other embodiments, as discussed in more detail herein, a valve member can have a tapered portion having multiple tapers. Moreover, although the side surfaces 164, 165 are shown as being angularly offset substantially symmetrical to the longitudinal axis Lv, in some embodiments, the side surfaces can be angularly offset in an asymmetrical fashion.

Figure 13:
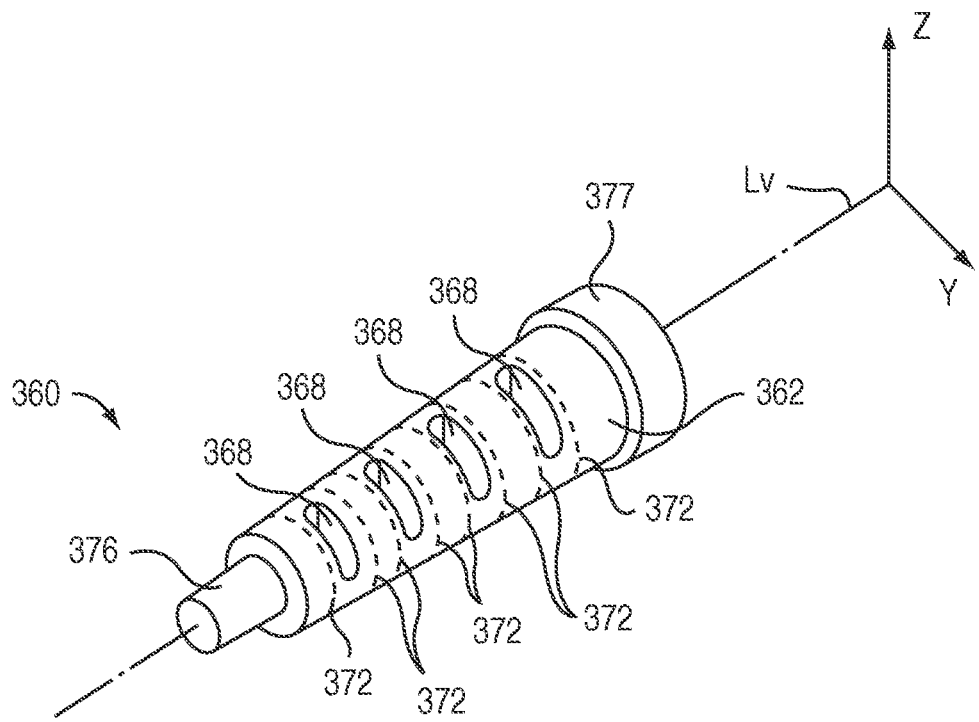
FIG. 13 is a perspective view of the valve member illustrated in FIGS. 10-12.

As shown in FIGS. 10, 11 and 13, the tapered portion 362 includes eight sealing portions 372, each extending continuously around the perimeter of the outer surface 363 of the tapered portion 362. The sealing portions 372 are arranged such that two of the sealing portions 372 are disposed adjacent each flow passage 368. In this manner, as shown in FIG. 8, when the cylinder head assembly 330 is in the closed position each of the sealing portions 372 is in contact with a portion of the interior surface 334 of the cylinder head 332 such that each flow passage 368 is fluidically isolated from the each cylinder flow passage 348 and/or each gas manifold flow passage 344. Conversely, when the cylinder head assembly 330 is in the opened position each of the sealing portions 372 is disposed apart from the interior surface 334 of the cylinder head 332 such that each flow passage 368 is in fluid communication with the corresponding cylinder flow passages 348 and the corresponding gas manifold flow passages 344.

Although the sealing portions 372 are shown and described as extending around the perimeter of the outer surface 363 substantially normal to the longitudinal axis Lv of the valve member 360, in some embodiments, the sealing portions can be at any angular relation to the longitudinal axis Lv. Moreover, in some embodiments, the sealing portions 372 can be angularly offset from each other.

Figure 14:
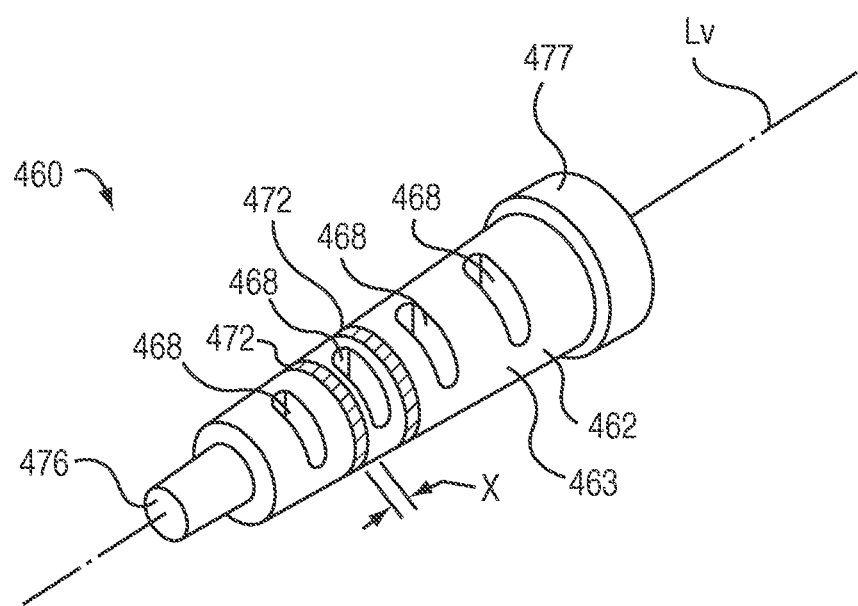
FIG. 14 is a perspective view of a valve member according to an embodiment of the invention.

Although the sealing portions 372 are shown and described as being a locus of points continuously extending around the perimeter of the outer surface 363 of the tapered portion 362 in a linear fashion when viewed in a plane parallel to the longitudinal axis Lv and the first axis Y (i.e., FIG. 10), in some embodiments, the sealing portions can continuously extend around the outer surface in a non-linear fashion. For example, in some embodiments, the sealing portions, when viewed in a plane parallel to the longitudinal axis Lv and the first axis Y, can be curved. In other embodiments, for example, as shown in FIG. 14, the sealing portions can be two-dimensional. FIG. 14 shows a valve member 460 having a tapered portion 472, a first stem portion 476 and a second stem portion 477. As described above, the tapered portion includes four flow passages 468 therethrough. The tapered portion also includes two sealing portions 472 disposed about each flow passage 468 and extending continuously around the perimeter of the outer surface 463 of the tapered portion 462 (for clarity, only two sealing portions 472 are shown). In contrast to the sealing portions 372 described above, the sealing portions 472 have a width X as measured along the longitudinal axis Lv of the valve member 460.

As illustrated in FIG. 12, the tapered portion 362 has an elliptical cross-section, which can allow for both a sufficient taper and flow passages of sufficient size. In other embodiments, however, the tapered portion can have any suitable cross-sectional shape, such as, for example, a circular cross-section, a rectangular cross-section and the like.

As shown in FIGS. 10-13, the valve member 360 is monolithically formed to include the first stem portion 376, the second stem portion 377 and the tapered portion 362. In other embodiments, however, the valve member includes separate components coupled together to form the first stem portion, the second stem portion and the tapered portion. In yet other embodiments, the valve member does not include a first stem portion and/or a second stem portion. For example, in some embodiments, a cylinder head assembly includes a separate component disposed within the valve pocket and configured to engage a valve lobe of a camshaft and a portion of a valve member such that a force can be directly transmitted from the camshaft to the valve member. Similarly, in some embodiments, a cylinder head assembly includes a separate component disposed within the valve pocket and configured to engage a spring and a portion of a valve member such that a force can be transmitted from the spring to the valve member.

Although the sealing portions 372 and the outer surface 363 are shown and described as being monolithically constructed, in some embodiments, the sealing portions can be separate components coupled to the outer surface of the tapered portion. For example, in some embodiments, the sealing portions can be sealing rings that are held into mating grooves on the outer surface of the tapered portion by a friction fit. In other embodiments, the sealing portions are separate components that are bonded to the outer surface of the tapered portion by any suitable means, such as, for example, chemical bonding, thermal bonding and the like. In yet other embodiments, the sealing portions include a coating applied to the outer surface of the tapered portion by any suitable manner, such as for example, electrostatic spray deposition, chemical vapor deposition, physical vapor deposition, ionic exchange coating, and the like.

The valve member 360 can be fabricated from any suitable material or combination of materials. For example, in some embodiments, the tapered portion can be fabricated from a first material, the stem portions can be fabricated from a second material different from the first material and the sealing portions, to the extent that they are separately formed, can be fabricated from a third material different from the first two materials. In this manner, each portion of the valve member can be constructed from a material that is best suited for its intended function. For example, in some embodiments, the sealing portions can be fabricated from a relatively soft stainless steel, such as for example, unhardened 430FR stainless steel, so that the sealing portions will readily wear when contacting the interior surface of the cylinder head. In this manner, the valve member can be continuously lapped during use, thereby ensuring a fluid-tight seal. In some embodiments, for example, the tapered portion can be fabricated from a relatively hard material having high strength, such as for example, hardened 440 stainless steel. Such a material can provide the necessary strength and/or hardness to resist failure that may result from repeated exposure to high temperature exhaust gas. In some embodiments, for example, one or both stem portions can be fabricated from a ceramic material configured to have high compressive strength.

In some embodiments, the cylinder head 332, including the interior surface 334 that defines the valve pocket 338, is monolithically constructed from a single material, such as, for example, cast iron. In some monolithic embodiments, for example, the interior surface 334 defining the valve pocket 338 can be machined to provide a suitable surface for engaging the sealing portions 372 of the valve member 360 such that a fluid-tight seal can be formed. In other embodiments, however, the cylinder head can be fabricated from any suitable combination of materials. As discussed in more detail herein, in some embodiments, a cylinder head can include one or more valve inserts disposed within the valve pocket. In this manner, the portion of the interior surface configured to contact the sealing portions of the valve member can be constructed from a material and/or in a manner conducive to providing a fluid-tight seal.

Figure 15:
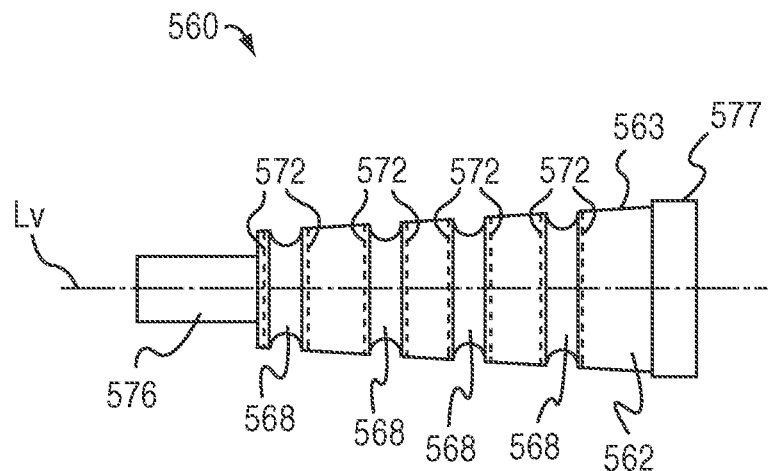
FIGS. 15 and 16 are top and front views, respectively, of a valve member according to an embodiment of the invention.
Figure 16:
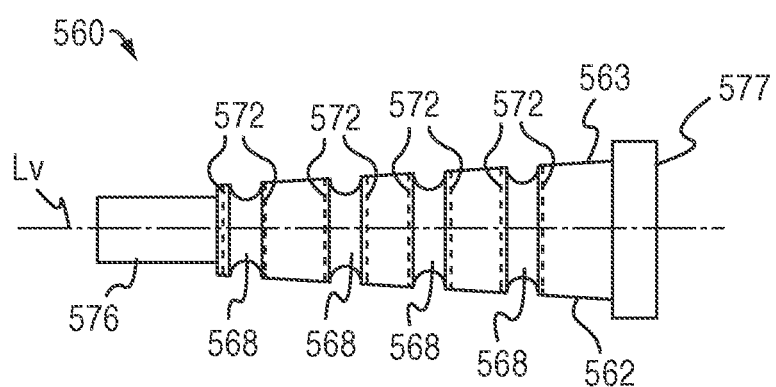

Although the flow passages 368 are shown and described as extending through the tapered portion 362 of the valve member 360 and having a first opening 369 and a second opening 370, in other embodiments, the flow passages do not extend through the valve member. FIGS. 15 and 16 show a top view and a front view, respectively, of a valve member 560 according to an embodiment of the invention in which the flow passages 568 extend around an outer surface 563 of the valve member 560. Similar to the valve member 360 described above, the valve member 560 includes a first stem portion 576, a second stem portion 577 and a tapered portion 562. The tapered portion 562 defines four flow passages 568 and eight sealing portions 572, each disposed adjacent to the edges of the flow passages 568. Rather than extending through the tapered portion 562, the illustrated flow passages 568 are recesses in the outer surface 563 that extend continuously around the outer surface 563 of the tapered portion 562.

Figure 24:
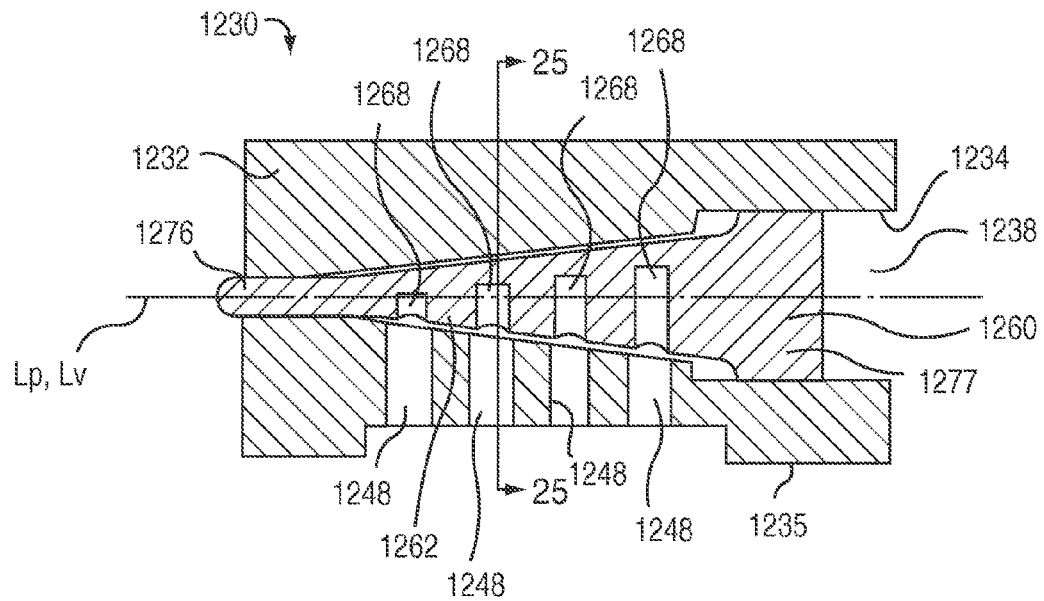
FIGS. 24 and 25 are front cross-sectional and side cross-sectional views, respectively, of a cylinder head assembly according to an embodiment of the invention.
Figure 25:
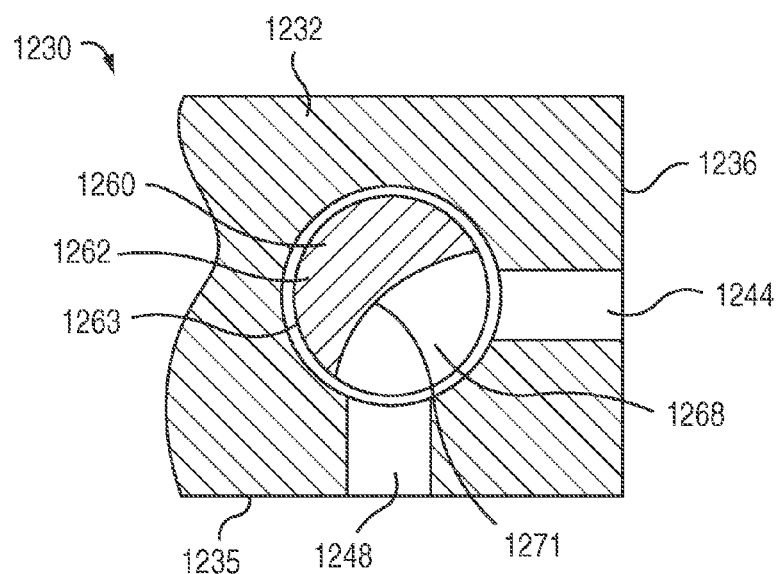

In other embodiments, the flow passages can be recesses that extend only partially around the outer surface of the tapered portion (see FIGS. 24 and 25, discussed in more detail herein). In yet other embodiments, the tapered portion can include any suitable combination of flow passage configurations. For example, in some embodiments, some of the flow passages can be configured to extend through the tapered portion while other flow passages can be configured to extend around the outer surface of the tapered portion.

Figure 17:
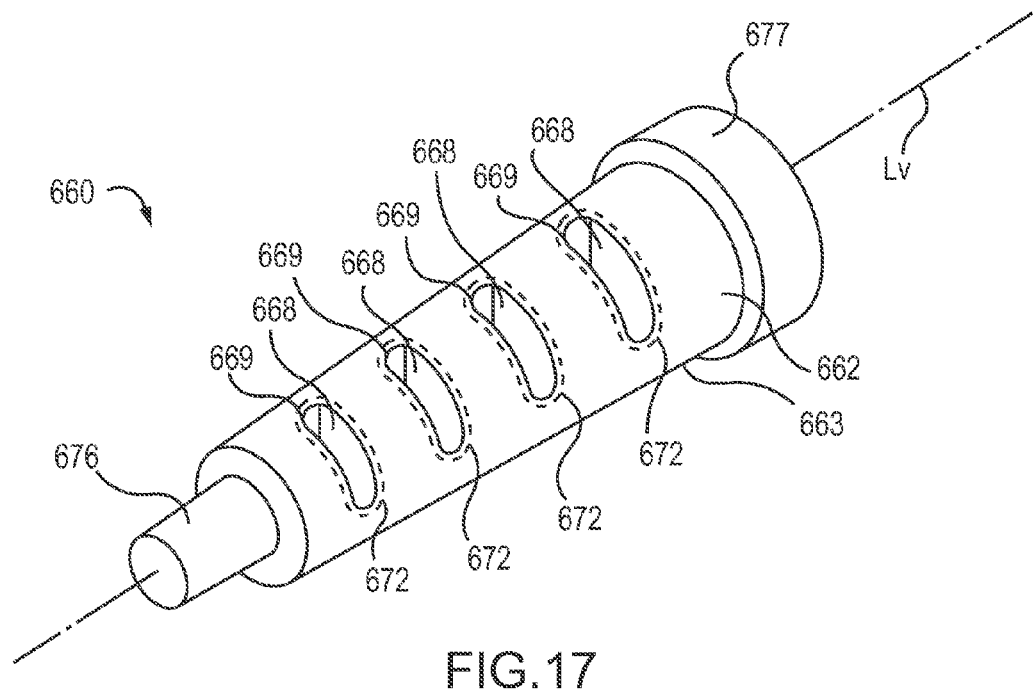
FIG. 17 is a perspective view of a valve member according to an embodiment of the invention.

Although the valve members are shown and described above as including multiple sealing portions that extend around the perimeter of the tapered portion, in other embodiments, the sealing portion does not extend around the perimeter of the tapered portion. For example, FIG. 17 shows a perspective view of a valve member 660 according to an embodiment of the invention in which the sealing portions 672 extend continuously around the openings 669 of the flow passages 668. Similar to the valve members described above, the valve member 660 includes a first stem portion 676, a second stem portion 677 and a tapered portion 662. The tapered portion 662 defines four flow passages 668 extending therethrough. Each flow passage 668 includes a first opening 669 and a second opening (not shown) disposed opposite the first opening. As described above, the first opening and the second opening of each flow passage 668 are configured to align with corresponding gas manifold flow passages and cylinder flow passages, respectively, defined by the cylinder head (not shown).

The tapered portion 662 includes four sealing portions 672 disposed on the outer surface 663 of the tapered portion 662. Each sealing portion 672 includes a locus of points that extends continuously around a first opening 669. In this arrangement, when the cylinder head assembly is in the closed configuration, the sealing portion 672 contacts a portion of the interior surface (not shown) of the cylinder head (not shown) such that the first opening 669 is fluidically isolated from its corresponding gas manifold flow passage (not shown). Although shown as including four sealing portions 672, each extending continuously around a first opening 669, in some embodiments, the sealing portions can extend continuously around the second opening 670, thereby fluidically isolating the second opening from the corresponding cylinder flow passage when the cylinder head assembly is in the closed configuration. In other embodiments, a valve member can include sealing portions extending around both the first opening 669 and the second opening 670.

Figure 18:
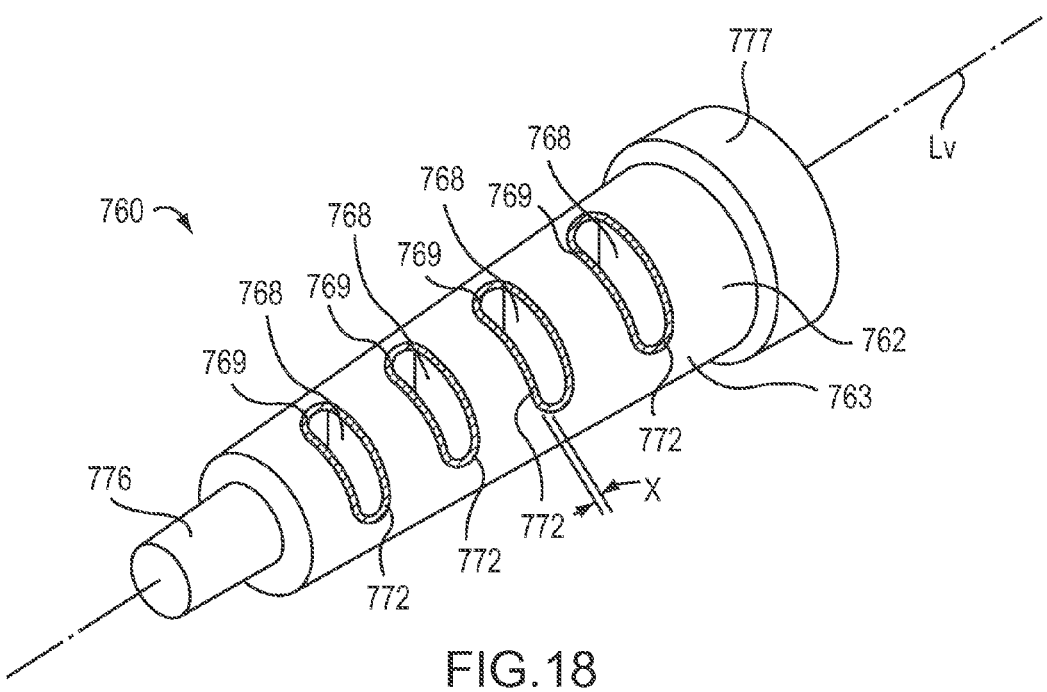
FIG. 18 is a perspective view of a valve member according to an embodiment of the invention.

FIG. 18 shows a perspective view of a valve member 760 according to an embodiment of the invention in which the sealing portions 772 are two-dimensional. As illustrated, the valve member 760 includes a tapered portion 772, a first stem portion 776 and a second stem portion 777. As described above, the tapered portion includes four flow passages 768 therethrough. The tapered portion also includes four sealing portions 772 each disposed adjacent each flow passage 768 and extending continuously around a first opening 769 of the flow passages 768. The sealing portions 772 differ from the sealing portions 672 described above, in that the sealing portions 772 have a width X as measured along the longitudinal axis Lv of the valve member 760.

Figure 19:
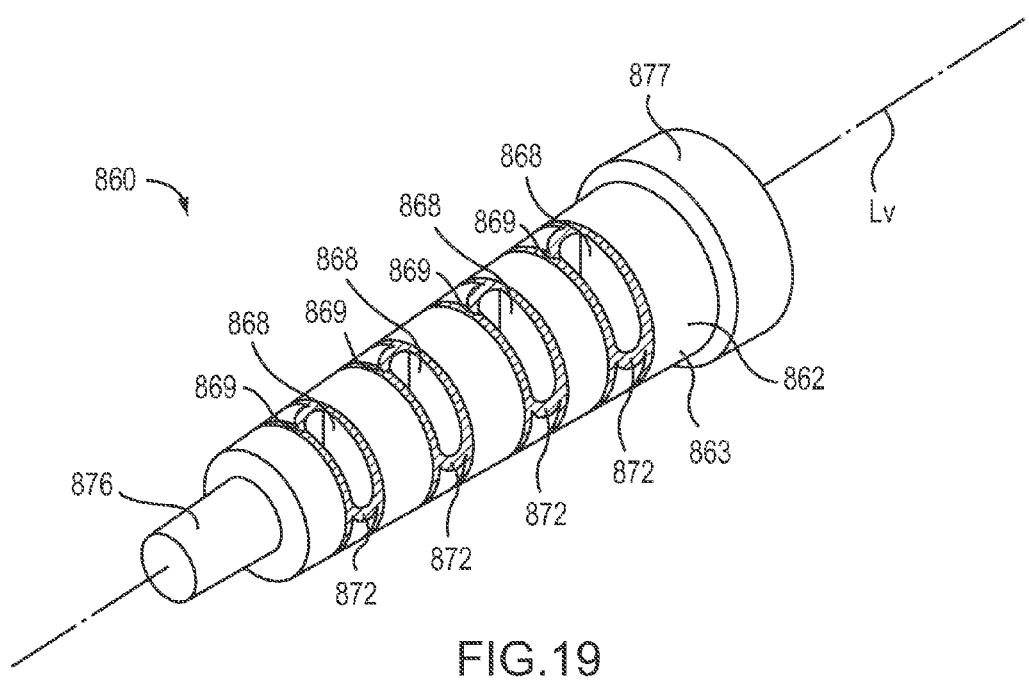
FIG. 19 is a perspective view of a valve member according to an embodiment of the invention.

FIG. 19 shows a perspective view of a valve member 860 according to an embodiment of the invention in which the sealing portions 872 extend around the perimeter of the tapered portion 862 and extend around the first openings 869. Similar to the valve members described above, the valve member 860 includes a first stem portion 876, a second stem portion 877 and a tapered portion 862. The tapered portion 862 defines four flow passages 868 extending therethrough.

Each flow passage 868 includes a first opening 869 and a second opening (not shown) disposed opposite the first opening. The tapered portion 862 includes sealing portions 872 disposed on the outer surface 863 of the tapered portion 862. As shown, each sealing portion 872 extends around the perimeter of the tapered portion 862 and extends around the first openings 869. In some embodiments, the sealing portions can comprise the entire space between adjacent openings.

Figure 20:
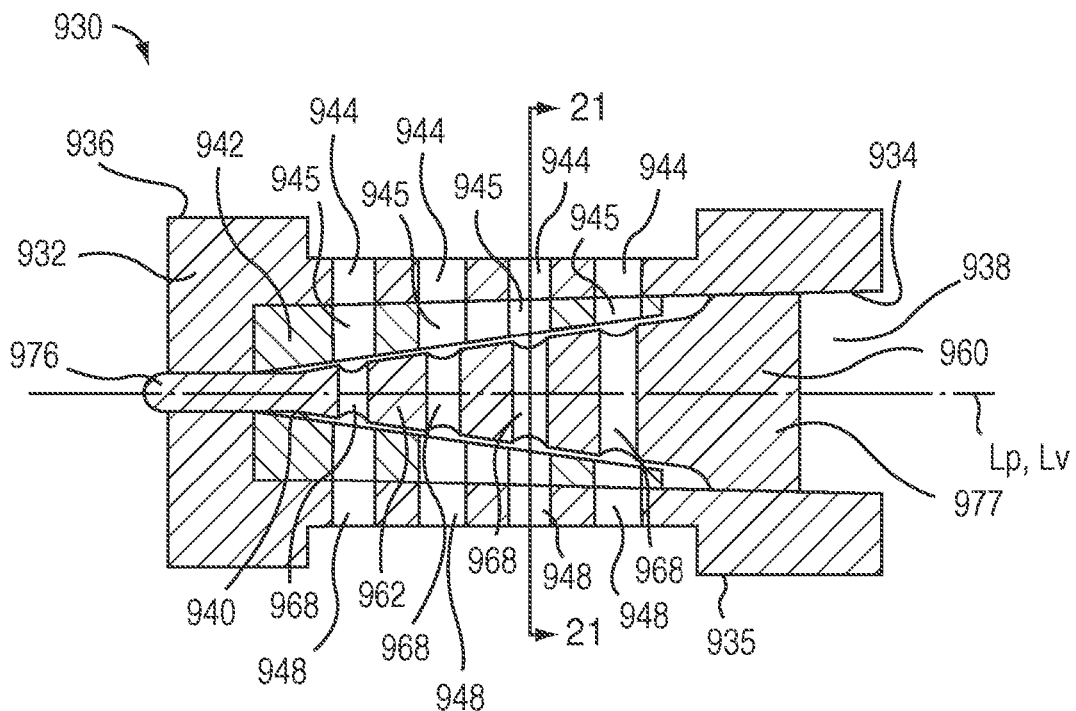
FIGS. 20 and 21 are front cross-sectional and side cross-sectional views, respectively, of a cylinder head assembly according to an embodiment of the invention.
Figure 21:
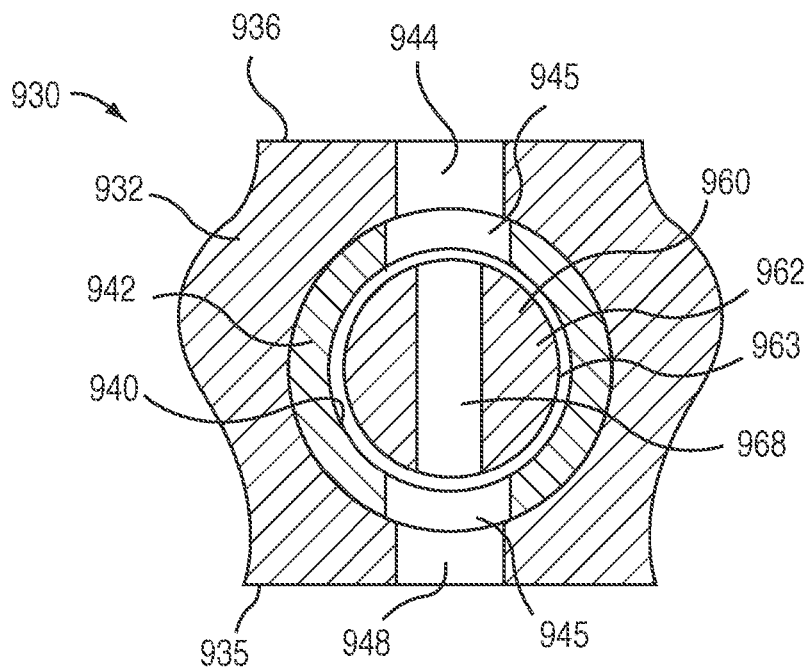

As discussed above, in some embodiments, a cylinder head can include one or more valve inserts disposed within the valve pocket. For example, FIGS. 20 and 21 show a portion of a cylinder head assembly 930 having a valve insert 942 disposed within the valve pocket 938. The illustrated cylinder head assembly 930 includes a cylinder head 932 and a valve member 960. The cylinder head 932 has a first exterior surface 935 configured to be coupled to a cylinder (not shown) and a second exterior surface 936 configured to be coupled to a gas manifold (not shown). The cylinder head 932 has an interior surface 934 that defines a valve pocket 938 having a longitudinal axis Lp. The cylinder head 932 also defines four cylinder flow passages 948 and four gas manifold flow passages 944, configured in a manner similar to those described above.

The valve insert 942 includes a sealing portion 940 and defines four insert flow passages 945 that extend through the valve insert. The valve insert 942 is disposed within the valve pocket 938 such that a first portion of each insert flow passage 945 is aligned with one of the gas manifold flow passages 944 and a second portion of each insert flow passage 945 is aligned with one of the cylinder flow passages 948.

The valve member 960 has a tapered portion 962, a first stem portion 976 and a second stem portion 977. The tapered portion 962 has an outer surface 963 and defines four flow passages 968 extending therethrough, as described above. The tapered portion 962 also includes multiple sealing portions (not shown) each of which is disposed adjacent one of the flow passages 968. The sealing portions can be of any type discussed above. The valve member 960 is disposed within the valve pocket 938 such that the tapered portion 962 of the valve member 960 can be moved along a longitudinal axis Lv of the valve member 960 within the valve pocket 938 between an opened position (FIGS. 20 and 21) and a closed position (not shown). When in the opened position, the valve member 960 is positioned within the valve pocket 938 such that each flow passage 968 is aligned with and in fluid communication with one of the insert flow passages 945, one of the cylinder flow passages 948 and one of the gas manifold flow passages 944. Conversely, when in the closed position, the valve member 960 is positioned within the valve pocket 938 such that the sealing portions are in contact with the sealing portion 940 of the valve insert 942. In this manner, the flow passages 968 are fluidically isolated from the cylinder flow passages 948 and/or the gas manifold flow passages 944.

As shown in FIG. 21, the valve pocket 938, the valve insert 942 and the valve member 960 all have a circular cross-sectional shape. In other embodiments, the valve pocket can have a non-circular cross-sectional shape. For example, in some embodiments, the valve pocket can include an alignment surface configured to mate with a corresponding alignment surface on the valve insert. Such an arrangement may be used, for example, to ensure that the valve insert is properly aligned (i.e., that the insert flow passages 945 are rotationally aligned to be in fluid communication with the gas manifold flow passages 944 and the cylinder flow passages 948) when the valve insert 942 is installed into the valve pocket 938. In other embodiments, the valve pocket, the valve insert and/or the valve member can have any suitable cross-sectional shape.

The valve insert 942 can be coupled within the valve pocket 938 using any suitable method. For example, in some embodiments, the valve insert can have an interference fit with the valve pocket. In other embodiments, the valve insert can be secured within the valve pocket by a weld, by a threaded coupling arrangement, by peening a surface of the valve pocket to secure the valve insert, or the like.

Figure 22:
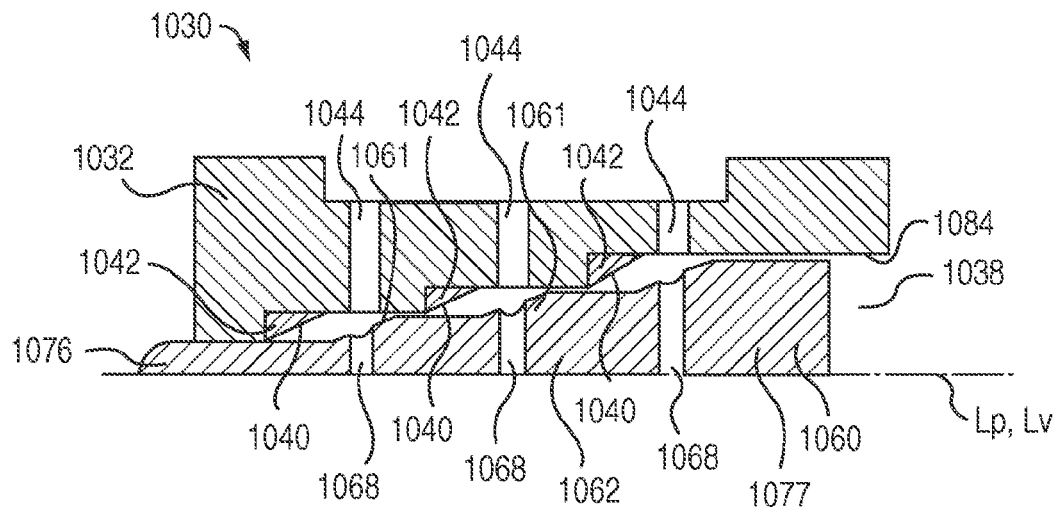
FIG. 22 is a front cross-sectional view of a portion of a cylinder head assembly according to an embodiment of the invention.

FIG. 22 shows a cross-sectional view of a portion of a cylinder head assembly 1030 according to an embodiment of the invention that includes multiple valve inserts 1042. Although FIG. 22 only shows one half of the cylinder head assembly 1030, one skilled in the art should recognize that the cylinder head assembly is generally symmetrical about the longitudinal axis Lp of the valve pocket, and is similar to the cylinder head assemblies shown and described above. The illustrated cylinder head assembly 1030 includes a cylinder head 1032 and a valve member 1060. As described above, the cylinder head 1032 can be coupled to at least one cylinder and at least one gas manifold. The cylinder head 1032 has an interior surface 1034 that defines a valve pocket 1038 having a longitudinal axis Lp. The cylinder head 1032 also defines three cylinder flow passages (not shown) and three gas manifold flow passages 1044.

As shown, the valve pocket 1038 includes several discontinuous, stepped portions. Each stepped portion includes a surface substantially parallel to the longitudinal axis Lp, through which one of the gas manifold passages 1044 extends. A valve insert 1042 is disposed within each discontinuous, stepped portion of the valve pocket 1038 such that a sealing portion 1040 of the valve insert 1042 is adjacent the tapered portions 1061 of the valve member 1060. In this arrangement, the valve inserts 1042 are not disposed about the gas manifold flow passages 1044 and therefore do not have an insert flow passage of the type described above.

The valve member 1060 has a central portion 1062, a first stem portion 1076 and a second stem portion 1077. The central portion 1062 includes three tapered portions 1061, each disposed adjacent a surface that is substantially parallel to the longitudinal axis of the valve member Lv. The central portion 1062 defines three flow passages 1068 extending therethrough and having an opening disposed on one of the tapered portions 1061. Each tapered portion 1061 includes one or more sealing portions of any type discussed above. The valve member 1060 is disposed within the valve pocket 1038 such that the central portion 1062 of the valve member 1060 can be moved along a longitudinal axis Lv of the valve member 1060 within the valve pocket 1038 between an opened position (shown in FIG. 22) and a closed position (not shown). When in the opened position, the valve member 1060 is positioned within the valve pocket 1038 such that each flow passage 1068 is aligned with and in fluid communication with one of the cylinder flow passages (not shown) and one of the gas manifold flow passages 1044. Conversely, when in the closed position, the valve member 1060 is positioned within the valve pocket 1038 such that the sealing portions on the tapered portions 1061 are in contact with the sealing portion 1040 of the corresponding valve insert 1042. In this manner, the flow passages 1068 are fluidically isolated from the gas manifold flow passages 1044 and/or the cylinder flow passages (not shown).

Figure 23:
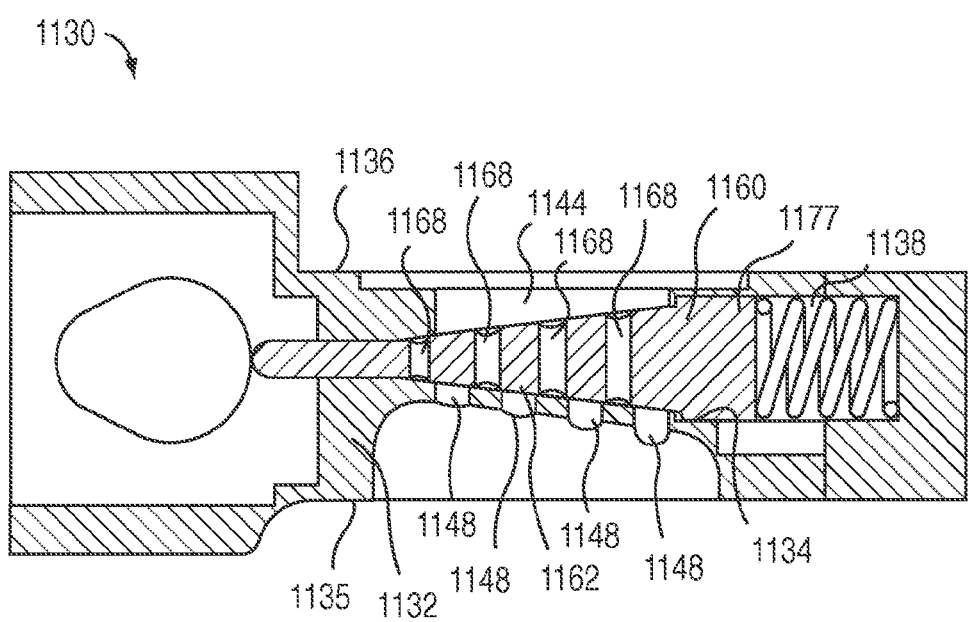
FIG. 23 is a front cross-sectional view of a cylinder head assembly according to an embodiment of the invention.

Although the cylinder heads are shown and described above as having the same number of gas manifold flow passages and cylinder flow passages, in some embodiments, a cylinder head can have fewer gas manifold flow passages than cylinder flow passages or vice versa. For example, FIG. 23 shows a cylinder head assembly 1160 according to an embodiment of the invention that includes a four cylinder flow passages 1148 by only one gas manifold flow passage 1144. The illustrated cylinder head assembly 1130 includes a cylinder head 1132 and a valve member 1160. The cylinder head 1132 has a first exterior surface 1135 configured to be coupled to a cylinder (not shown) and a second exterior surface 1136 configured to be coupled to a gas manifold (not shown). The cylinder head 1132 has an interior surface 1134 that defines a valve pocket 1138 within which the valve member 1160 is disposed. As shown, the cylinder head 1132 defines four cylinder flow passages 1148 and one gas manifold flow passage 1144, configured similar to those described above.

The valve member 1160 has a tapered portion 1162, a first stem portion 1176 and a second stem portion 1177. The tapered portion 1162 defines four flow passages 1168 extending therethrough, as described above. The tapered portion 1162 also includes multiple sealing portions each of which is disposed adjacent one of the flow passages 1168. The sealing portions can be of any type discussed above.

The cylinder head assembly 1130 differs from those described above in that when the cylinder head assembly 1130 is in the closed configuration (see FIG. 23), the flow passages 1168 are not fluidically isolated from the gas manifold flow passage 1144. Rather, the flow passages 1168 are only isolated from the cylinder flow passages 1148, in a manner described above.

Although the engines are shown and described as having a cylinder coupled to a first surface of a cylinder head and a gas manifold coupled to a second surface of a cylinder head, wherein the second surface is opposite the first surface thereby producing a "straight flow" configuration, the cylinder and the gas manifold can be arranged in any suitable configuration. For example, in some instances, it may be desirable for the gas manifold to be coupled to a side surface 1236 of a the cylinder head. FIGS. 24 and 25 show a cylinder head assembly 1230 according to an embodiment of the invention in which the cylinder flow passages 1248 are substantially normal to the gas manifold flow passages 1244. In this manner, a gas manifold (not shown) can be mounted on a side surface 1236 of the cylinder head 1232.

The illustrated cylinder head assembly 1230 includes a cylinder head 1232 and a valve member 1260. The cylinder head 1232 has a bottom surface 1235 configured to be coupled to a cylinder (not shown) and a side surface 1236 configured to be coupled to a gas manifold (not shown). The side surface 1236 is disposed adjacent to and substantially normal to the bottom surface 1235. In other embodiments, the side surface can be angularly offset from the bottom surface by an angle other than 90 degrees. The cylinder head 1232 has an interior surface 1234 that defines a valve pocket 1238 having a longitudinal axis Lp. The cylinder head 1232 also defines four cylinder flow passages 1248 and four gas manifold flow passages 1244. The cylinder flow passages 1248 and the gas manifold flow passages 1244 differ from those previously discussed in that the cylinder flow passages 1248 are substantially normal to the gas manifold flow passages 1244.

The valve member 1260 has a tapered portion 1262, a first stem portion 1276 and a second stem portion 1277. The tapered portion 1262 includes an outer surface 1263 and defines four flow passages 1268. The flow passages 1268 are not lumens that extend through the tapered portion 1262, but rather are recesses in the tapered portion 1262 that extend partially around the outer surface 1263 of the tapered portion 1262. The flow passages 1268 include a curved surface 1271 to direct the flow of gas through the valve member 1260 in a manner that minimizes the flow losses. In some embodiments, a surface 1271 of the flow passages 1268 can be configured to produce a desired flow characteristic, such as, for example, a rotational flow pattern in the incoming and/or outgoing flow.

The tapered portion 1262 also includes multiple sealing portions (not shown) each of which is disposed adjacent one of the flow passages 1268. The sealing portions can be of any type discussed above. The valve member 1260 is disposed within the valve pocket 1238 such that the tapered portion 1262 of the valve member 1260 can be moved along a longitudinal axis Lv of the valve member 1260 within the valve pocket 1238 between an opened position (FIGS. 24 and 25) and a closed position (not shown), as described above.

Figure 26:
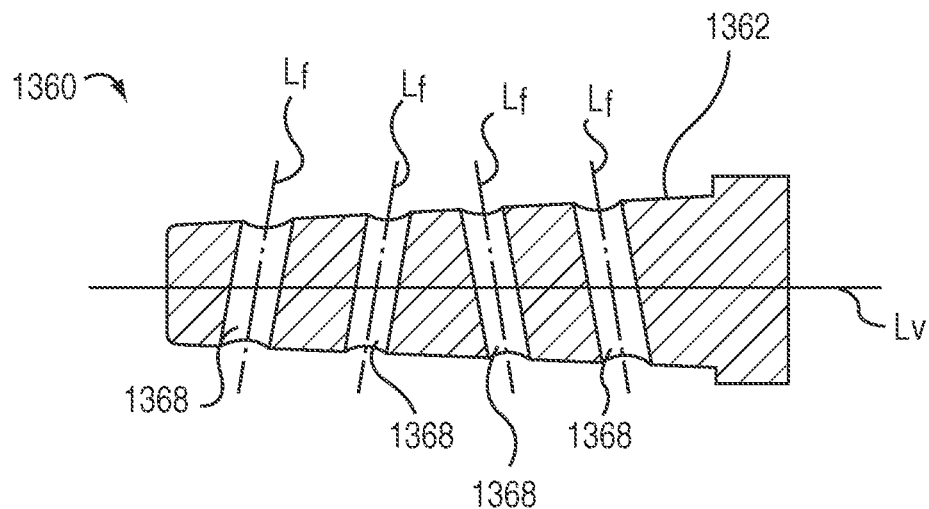
FIG. 26 is a cross-sectional view of a valve member according to an embodiment of the invention.

Although the flow passages defined by the valve member have been shown and described as being substantially parallel to each other and substantially normal to the longitudinal axis of the valve member, in some embodiments the flow passages can be angularly offset from each other and/or can be offset from the longitudinal axis of the valve member by an angle other than 90 degrees. Such an offset may be desirable, for example, to produce a desired flow characteristic, such as, for example, swirl or tumble pattern in the incoming and/or outgoing flow. FIG. 26 shows a cross-sectional view of a valve member 1360 according to an embodiment of the invention in which the flow passages 1368 are angularly offset from each other and are not normal to the longitudinal axis Lv. Similar to the valve members described above, the valve member 1360 includes a tapered portion 1362 that defines four flow passages 1368 extending therethrough. Each flow passage 1368 has a longitudinal axis Lf. As illustrated, the longitudinal axes Lf are angularly offset from each other. Moreover, the longitudinal axes Lf are offset from the longitudinal axis of the valve member by an angle other than 90 degrees.

Although the flow passages 1368 are shown and described as having a linear shape and defining a longitudinal axis Lf, in other embodiments, the flow passages can have a curved shape characterized by a curved centerline. As described above, flow passages can be configured to have a curved shape to produce a desired flow characteristic in the gas entering and/or exiting the cylinder.

Figure 27:
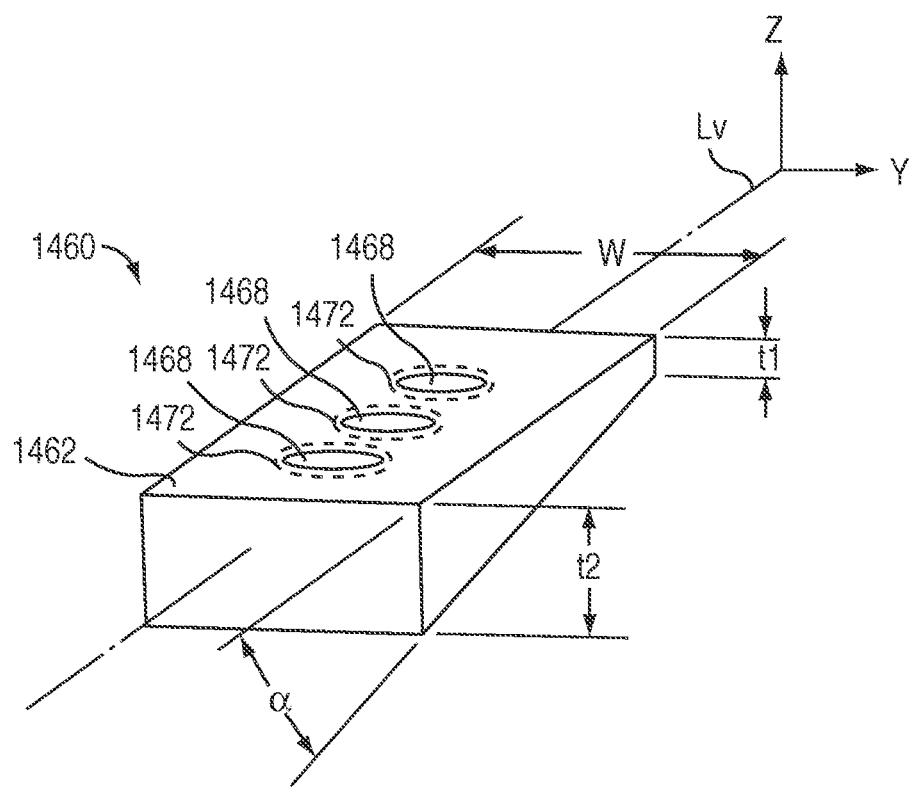
FIG. 27 is a perspective view of a valve member according to an embodiment of the invention having a one-dimensional tapered portion.

FIG. 27 is a perspective view of a valve member 1460 according to an embodiment of the invention that includes a one-dimensional tapered portion 1462. The illustrated valve member 1460 includes a tapered portion 1462 that defines three flow passages 1468 extending therethrough. The tapered portion includes three sealing portions 1472, each of which is disposed adjacent one of the flow passages 1468 and extends continuously around an opening of the flow passage 1468.

The tapered portion 1462 of the valve member 1460 has a width W measured along a first axis Y that is normal to a longitudinal axis Lv of the tapered portion 1462. Similarly, the tapered portion 1462 has a thickness T measured along a second axis Z that is normal to both the longitudinal axis Lv and the first axis Y. The tapered portion 1462 has a one-dimensional taper characterized by a linear change in the thickness T. Conversely, the width W remains constant along the longitudinal axis Lv. As shown, the thickness of the tapered portion 1462 increases from a value of T1 at one end of the tapered portion 1462 to a value of T2 at the opposite end of the tapered portion 1462. The change in thickness along the longitudinal axis Lv defines a taper angle α.

Figure 28:
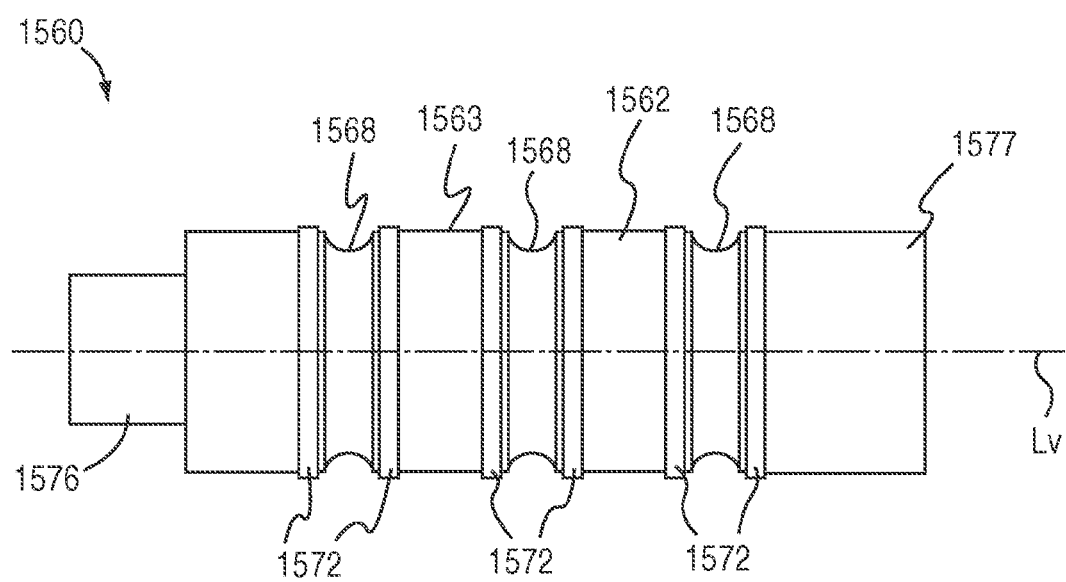
FIG. 28 is a front view of a valve member according to an embodiment of the invention.

Although the valve members have been shown and described as including at least one tapered portion that includes one or more sealing portions, in some embodiments, a valve member can include a sealing portion disposed on a non-tapered portion of the valve member. In other embodiments, a valve member can be devoid of a tapered portion. FIG. 28 is a front view of a valve member 1560 that is devoid of a tapered portion. The illustrated valve member 1560 has a central portion 1562, a first stem portion 1576 and a second stem portion 1577. The central portion 1562 has an outer surface 1563 and defines three flow passages 1568 extending continuously around the outer surface 1563 of the central portion 1562, as described above. The central portion 1562 also includes multiple sealing portions 1572 each of which is disposed adjacent one of the flow passages 1568 and extends continuously around the perimeter of the central portion 1562.

In a similar manner as described above, the valve member 1560 is disposed within a valve pocket (not shown) such that the central portion 1562 of the valve member 1560 can be moved along a longitudinal axis Lv of the valve member 1560 within the valve pocket between an opened position and a closed position. When in the opened position, the valve member 1560 is positioned within the valve pocket such that each flow passage 1568 is aligned with and in fluid communication with the corresponding cylinder flow passages and gas manifold flow passages (not shown). Conversely, when in the closed position, the valve member 1560 is positioned within the valve pocket such that the sealing portions 1572 are in contact with a portion of the interior surface of the cylinder head, thereby are fluidically isolating the flow passages 1568.

As described above, the sealing portions 1572 can be, for example, sealing rings that are disposed within a groove defined by the outer surface of the valve member. Such sealing rings can be, for example, spring-loaded rings, which are configured to expand radially, thereby ensuring contact with the interior surface of the cylinder head when the valve member 1560 is in the closed position.

Figure 29:
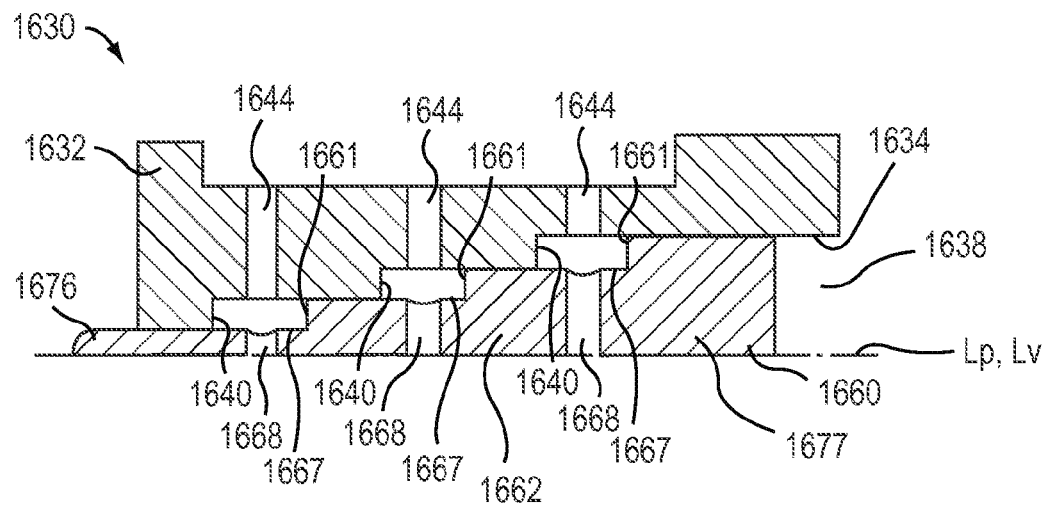
FIGS. 29 and 30 are front cross-sectional views of a portion of a cylinder head assembly according to an embodiment of the invention in a first configuration and a second configuration, respectively.
Figure 30:
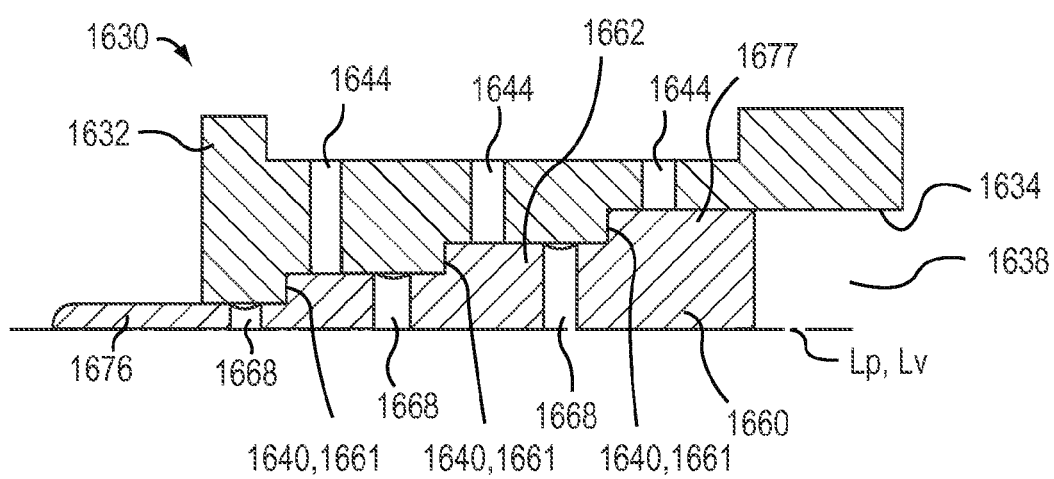

Conversely, FIGS. 29 and 30 show portion of a cylinder head assembly 1630 that includes multiple 90 degree tapered portions 1631 in a first and second configuration, respectively. Although FIGS. 29 and 30 only show one half of the cylinder head assembly 1630, one skilled in the art should recognize that the cylinder head assembly is generally symmetrical about the longitudinal axis Lp of the valve pocket, and is similar to the cylinder head assemblies shown and described above. The illustrated cylinder head assembly 1630 includes a cylinder head 1632 and a valve member 1660. The cylinder head 1632 has an interior surface 1634 that defines a valve pocket 1638 having a longitudinal axis Lp and several discontinuous, stepped portions. The cylinder head 1632 also defines three cylinder flow passages (not shown) and three gas manifold flow passages 1644.

The valve member 1660 has a central portion 1662, a first stem portion 1676 and a second stem portion 1677. The central portion 1662 includes three tapered portions 1661 and three non-tapered portions 1667. The tapered portions 1661 each have a taper angle of 90 degrees (i.e., substantially normal to the longitudinal axis Lv). Each tapered portion 1661 is disposed adjacent one of the non-tapered portions 1667. The central portion 1662 defines three flow passages 1668 extending therethrough and having an opening disposed on one of the non-tapered portions 1667. Each tapered portion 1661 includes a sealing portion that extends around the perimeter of the outer surface of the valve member 1660.

The valve member 1660 is disposed within the valve pocket 1638 such that the central portion 1662 of the valve member 1660 can be moved along a longitudinal axis Lv of the valve member 1660 within the valve pocket 1638 between an opened position (shown in FIG. 29) and a closed position (shown in FIG. 30). When in the opened position, the valve member 1660 is positioned within the valve pocket 1638 such that each flow passage 1668 is aligned with and in fluid communication with one of the cylinder flow passages (not shown) and one of the gas manifold flow passages 1644. Conversely, when in the closed position, the valve member 1660 is positioned within the valve pocket 1638 such that the sealing portions on the tapered portions 1661 are in contact with a corresponding sealing portion 1640 defined by the valve pocket 1638. In this manner, the flow passages 1668 are fluidically isolated from the gas manifold flow passages 1644 and/or the cylinder flow passages (not shown).

Although some of the valve members are shown and described as including a first stem portion configured to engage a camshaft and a second stem portion configured to engage a spring, in some embodiments, a valve member can include a first stem portion configured to engage a biasing member and a second stem portion configured to engage an actuator. In other embodiments, an engine can include two camshafts, each configured to engage one of the stem portions of the valve member. In this manner, the valve member can be biased in the closed position by a valve lobe on the camshaft rather than a spring. In yet other embodiments, an engine can include one camshaft and one actuator, such as, for example, a pneumatic actuator, a hydraulic actuator, an electronic solenoid actuator or the like.

Figure 31:
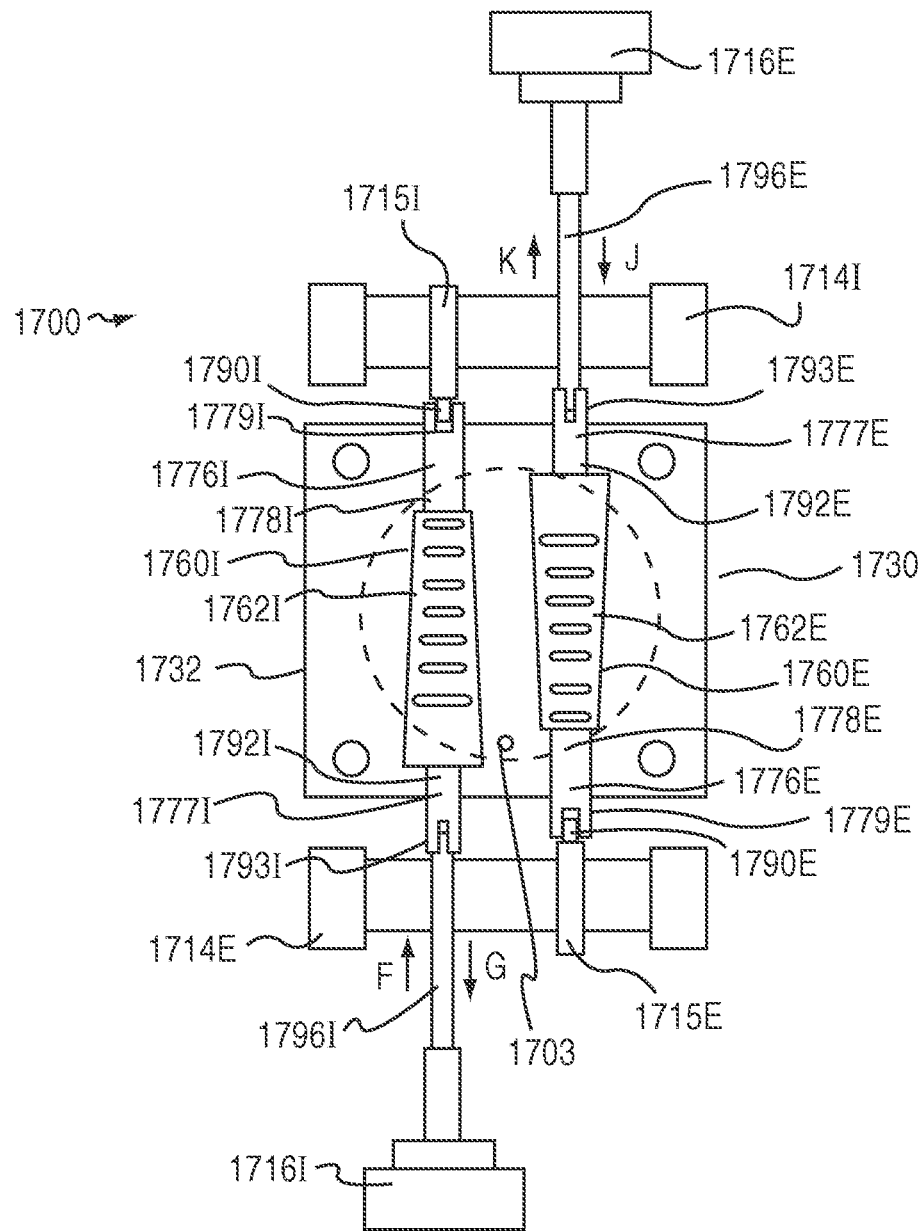
FIG. 31 is a top view of a portion of an engine according to an embodiment of the invention.

FIG. 31 is a top view of a portion of an engine 1700 according to an embodiment of the invention that includes both camshafts 1714 and solenoid actuators 1716 configured to move the valve member 1760. The engine 1700 includes a cylinder 1703, a cylinder head assembly 1730 and a gas manifold (not shown). The cylinder head assembly 1730 includes a cylinder head 1732, an intake valve member 1760I and an exhaust valve member 1760E. The cylinder head 1732 can include any combination of the features discussed above, such as, for example, an intake valve pocket, an exhaust valve pocket, multiple cylinder flow passages, at least one manifold flow passage and the like.

The intake valve member 1760I has tapered portion 1762I, a first stem portion 1776I and a second stem portion 1777I. The first stem portion 1776I has a first end 1778I and a second end 1779I. Similarly, the second stem portion 1777I has a first end 1792I and a second end 1793I. The first end 1778I of the first stem portion 1776I is coupled to the tapered portion 1762I. The second end 1779I of the first stem portion 1776I includes a roller-type follower 1790I configured to engage an intake valve lobe 1715I of an intake camshaft 1714I. The first end 1792I of the second stem portion 1777I is coupled to the tapered portion 1762I. The second end 1793I of the second stem portion 1777I is coupled to an actuator linkage 1796I, which is coupled a solenoid actuator 1716I.

Similarly, the exhaust valve member 1760E has tapered portion 1762E, a first stem portion 1776E and a second stem portion 1777E. A first end 1778E of the first stem portion 1776E is coupled to the tapered portion 1762E. A second end 1779E of the first stem portion 1776E includes a roller-type follower 1790E configured to engage an exhaust valve lobe 1715E of an exhaust camshaft 1714E. A first end 1792E of the second stem portion 1777E is coupled to the tapered portion 1762E. A second end 1793E of the second stem portion 1777E is coupled to an actuator linkage 1796E, which is coupled a solenoid actuator 1716E.

In this arrangement, the valve members 1760I, 1760E can be moved by the intake valve lobe 1715I and the exhaust valve lobe 1715E, respectively, as described above. Additionally, the solenoid actuators 1716I, 1716E can supply a biasing force to bias the valve members 1760I, 1760E in the closed position, as indicated by the arrows F (intake) and J (exhaust). Moreover, in some embodiments, the solenoid actuators 1716I, 1716E can be used to override the standard valve timing as prescribed by the valve lobes 1715I, 1715E, thereby allowing the valves 1760I, 1760E to remain open for a greater duration (as a function of crank angle and/or time).

Although the engine 1700 is shown and described as including a solenoid actuator 1716 and a camshaft 1714 for controlling the movement of the valve members 1760, in other embodiments, an engine can include only a solenoid actuator for controlling the movement of each valve member. In such an arrangement, the absence of a camshaft allows the valve members to be opened and/or closed in any number of ways to improve engine performance. For example, as discussed in more detail herein, in some embodiments the intake and/or exhaust valve members can be cycled opened and closed multiple times during an engine cycle (i.e., 720 crank degrees for a four stroke engine). In other embodiments, the intake and/or exhaust valve members can be held in a closed position throughout an entire engine cycle.

The cylinder head assemblies shown and described above are particularly well suited for camless actuation and/or actuation at any point in the engine operating cycle. More specifically, as previously discussed, because the valve members shown and described above do not extend into the combustion chamber when in their opened position, they will not contact the piston at any time during engine operation. Accordingly, the intake and/or exhaust valve events (i.e., the point at which the valves open and/or close as a function of the angular position of the crankshaft) can be configured independently from the position of the piston (i.e., without considering valve-to-piston contact as a limiting factor). For example, in some embodiments, the intake valve member and/or the exhaust valve member can be fully opened when the piston is at top dead center (TDC).

Moreover, the valve members shown and described above can be actuated with relatively little power during engine operation, because the opening of the valve members is not opposed by cylinder pressure, the stroke of the valve members is relatively low and/or the valve springs opposing the opening of the valves can have relatively low biasing force. For example, as discussed above, the stroke of the valve members can be reduced by including multiple flow passages therein and reducing the spacing between the flow passages. In some embodiments, the stroke of a valve member can be 2.3 mm (0.090 in.).

In addition to directly reducing the power required to open the valve member, reducing the stroke of the valve member can also indirectly reduce the power requirements by allowing the use of valve springs having a relatively low spring force. In some embodiments, the spring force can be selected to ensure that a portion of the valve member remains in contact with the actuator during valve operation and/or to ensure that the valve member does not repeatedly oscillate along its longitudinal axis when opening and/or closing. Said another way, the magnitude of the spring force can be selected to prevent valve "bounce" during operation. In some embodiments, reducing the stroke of the valve member can allow for the valve member to be opened and/or closed with reduced velocity, acceleration and jerk (i.e., the first derivative of the acceleration) profiles, thereby minimizing the impact forces and/or the tendency for the valve member to bounce during operation. As a result, some embodiments, the valve springs can be configured to have a relatively low spring force. For example, in some embodiments, a valve spring can be configured to exert a spring force of 110 N (50 lbf) when the valve member is both in the closed position and the opened position.

As a result of the reduced power required to actuate the valve members 1760I, 1760E, in some embodiments, the solenoid actuators 1716I, 1716E can be 12 volt actuators requiring relatively low current. For example, in some embodiments, the solenoid actuators can operate on 12 volts with a current draw during valve opening of between 14 and 15 amperes of current. In other embodiments, the solenoid actuators can be 12 volt actuators configured to operate on a high voltage and/or current during the initial valve member opening event and a low voltage and/or current when holding the valve member open. For example, in some embodiments, the solenoid actuators can operate on a "peak and hold" cycle that provides an initial voltage of between 70 and 90 volts during the first 100 microseconds of the valve opening event.

In addition to reducing engine parasitic losses, the reduced power requirements and/or reduced valve member stroke also allow greater flexibility in shaping the valve events. For example, in some embodiments the valve members can be configured to open and/or close such that the flow area through the valve member as a function of the crankshaft position approximates a square wave.

Figure 32:
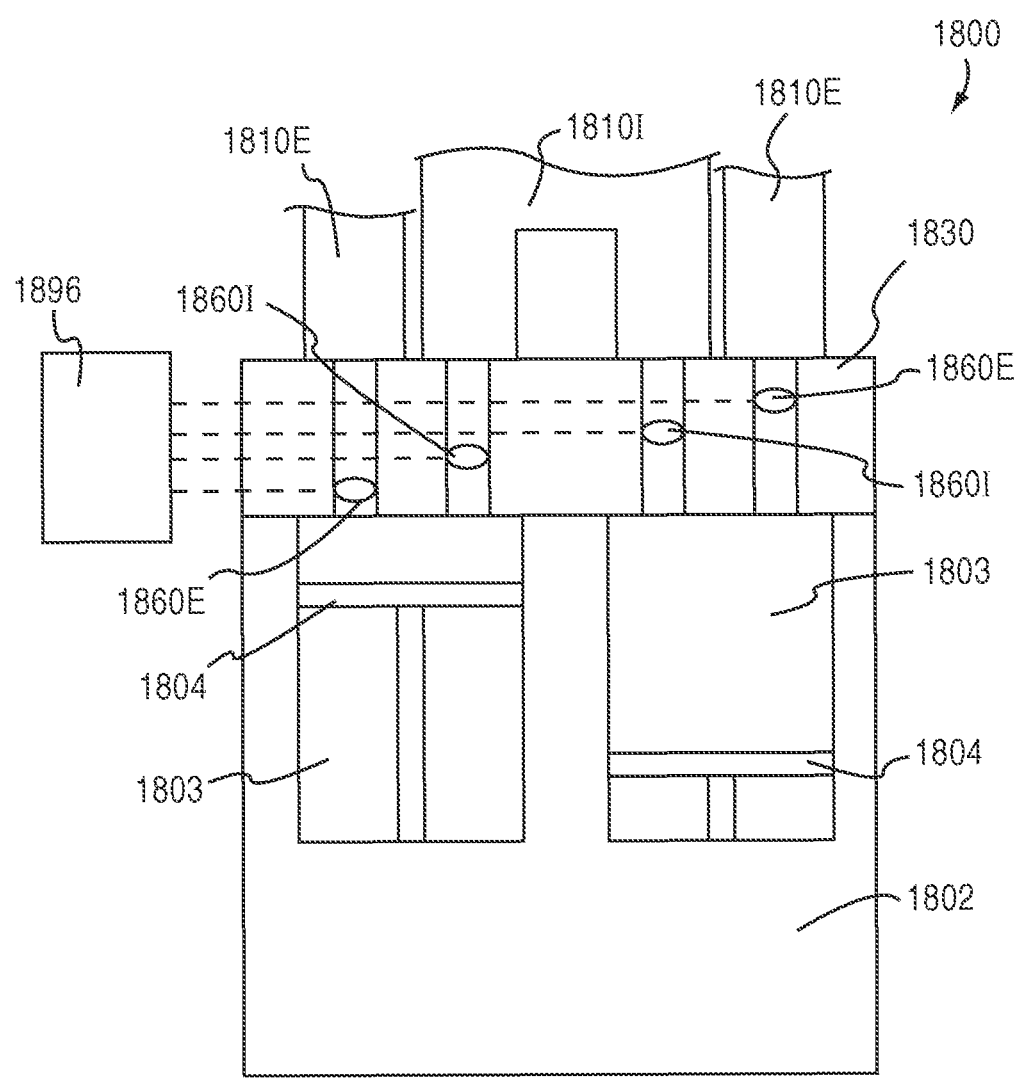
FIG. 32 is a schematic illustrating a portion of an engine according to an embodiment of the invention.

As described above, in some embodiments, the intake valve member and/or the exhaust valve member can be held open for longer durations, opened and closed multiple times during an engine cycle and the like. FIG. 32 is a schematic of a portion of an engine 1800 according to an embodiment of the invention. The engine 1800 includes an engine block 1802 defining two cylinders 1803. The cylinders 1803 can be, for example, two cylinders of a four cylinder engine. A reciprocating piston 1804 is disposed within each cylinder 1803, as described above. A cylinder head 1830 is coupled to the engine block 1802. Similar to the cylinder head assemblies described above, the cylinder head 1830 includes two electronically actuated intake valves 1860I and two electronically actuated exhaust valves 1860E. The intake valves 1860I are configured to control the flow of gas between an intake manifold 1810I and each cylinder 1803. Similarly, the exhaust valves 1860E control the exchange of gas between an exhaust manifold 1810E and each cylinder.

The engine 1800 includes an electronic control unit (ECU) 1896 in communication with each of the intake valves 1860I and the exhaust valves 1860E. The ECU is processor of the type known in the art configured to receive input from various sensors, determine the desired engine operating conditions and convey signals to various actuators to control the engine accordingly. In the illustrated embodiment, the ECU 1896 is configured determine the appropriate valve events and provide an electronic signal to each of the valves 1860I, 1860E so that the valves open and close as desired.

The ECU 1896 can be, for example, a commercially-available processing device configured to perform one or more specific tasks related to controlling the engine 1800. For example, the ECU 1896 can include a microprocessor and a memory device. The microprocessor can be, for example, an application-specific integrated circuit (ASIC) or a combination of ASICs, which are designed to perform one or more specific functions. In yet other embodiments, the microprocessor can be an analog or digital circuit, or a combination of multiple circuits. The memory device can include, for example, a read only memory (ROM) component, a random access memory (RAM) component, electronically programmable read only memory (EPROM), erasable electronically programmable read only memory (EEPROM), and/or flash memory.

Although the engine 1800 is illustrated and described as including an ECU 1896, in some embodiments, an engine 1800 can include software in the form of processor-readable code instructing a processor to perform the functions described herein. In other embodiments, an engine 1800 can include firmware that performs the functions described herein.

Figure 33:
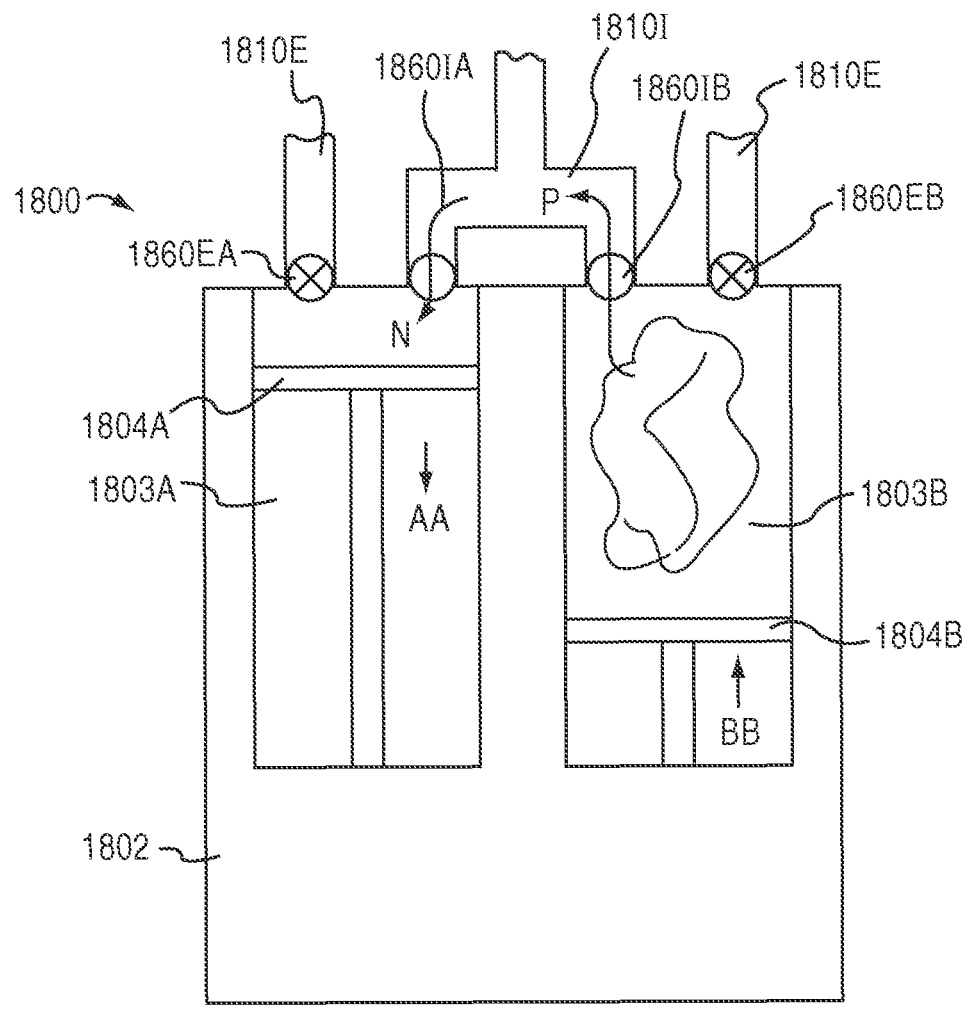
FIG. 33 is a schematic illustrating a portion of the engine shown in FIG. 32 operating in a pumping assist mode.

FIG. 33 is a schematic of a portion of the engine 1800 operating in a "cylinder deactivation" mode. Cylinder deactivation is a method of improving the overall efficiency of an engine by temporarily deactivating the combustion event in one or more cylinders during periods in which the engine is operating at reduced loads (i.e. when the engine is producing a relatively low amount of torque and/or power), such as, for example, when a vehicle is operating at highway speeds. Operating at reduced loads is inherently inefficient due to, among other things, the high pumping losses associated with throttling the intake air. In such instances, the overall engine efficiency can be improved by deactivating the combustion event in one or more cylinders, which requires the remaining cylinders to operate at a higher load and therefore with less throttling of the intake air, thereby reducing the pumping losses.

When the engine 1800 is operating in the cylinder deactivation mode, cylinder 1803A, which can be, for example cylinder #4 of a four cylinder engine, is the firing cylinder, operating on a standard four stroke combustion cycle. Conversely, cylinder 1803B, which can be, for example, cylinder #3 of a four cylinder engine, is the deactivated cylinder. As shown in FIG. 33, the engine 1800 is configured such that the piston 1804A within the firing cylinder 1803A is moving downwardly from top dead center (TDC) towards bottom dead center (BDC) on the intake stroke, as indicated by arrow AA. During the intake stroke, the intake valve 1860IA is opened thereby allowing air or an air/fuel mixture to flow from the intake manifold 1810I into the cylinder 1803A, as indicated by arrow N. The exhaust valve 1860EA is closed, such that the cylinder 1803A is fluidically isolated from the exhaust manifold 1810E.

Conversely, the piston 1804B within the deactivated cylinder 1803B is moving upwardly from BDC towards TDC, as indicated by arrow BB. As illustrated, the intake valve 1860IB is opened thereby allowing air to flow from the cylinder 1803B into the intake manifold 1810I, as indicated by arrow P. The exhaust valve 1860EB is closed such that the cylinder 1803B is fluidically isolated from the exhaust manifold 1810E. In this manner, the engine 1800 is configured so that cylinder 1803B operates to pump air contained therein into the intake manifold 1810I and/or cylinder 1803A. Said another way, cylinder 1803B is configured to act as a supercharger. In this manner, the engine 1800 can operate in a "standard" mode, in which cylinders 1803A and 1803B operate as naturally aspirated cylinders to combust fuel and air, and a "pumping assist" mode, in which cylinder 1803B is deactivated and the cylinder 1803A operates as a boosted cylinder to combust fuel and air.

Although the engine 1800 is shown and described operating in a cylinder deactivation mode in which one cylinder supplies air to another cylinder, in some embodiments, an engine can operate in a cylinder deactivation mode in which both the exhaust valve and the intake valve of the non-firing cylinder remain closed throughout the entire engine cycle. In other embodiments, an engine can operate in a cylinder deactivation mode in which the intake valve and/or exhaust valve of the non-firing cylinder is held open throughout the entire engine cycle, thereby eliminating the parasitic losses associated with pumping air through the non-firing cylinder. In yet other embodiments, an engine can operate in a cylinder deactivation mode in which the non-firing cylinder is configured to absorb power from the vehicle, thereby acting as a vehicle brake. In such embodiments, for example, the exhaust valve of the non-firing cylinder can be configured to open early so that the compressed air contained therein is released without producing any expansion work.

Figure 34:
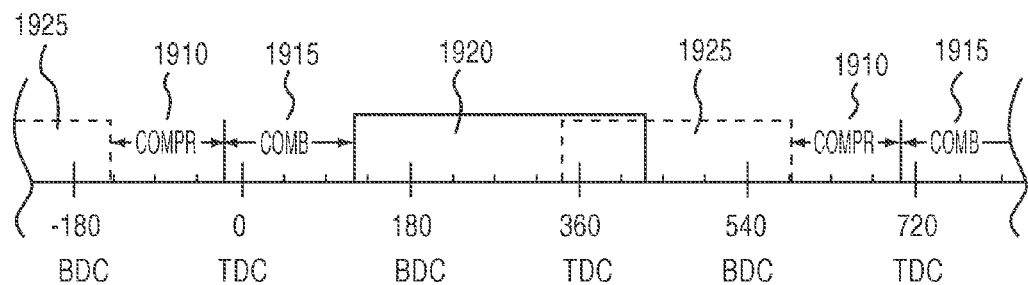
FIGS. 34-36 are graphical representations of the valve events of an engine according to an embodiment of the invention operating in a first mode and second mode, respectively.
Figure 35:
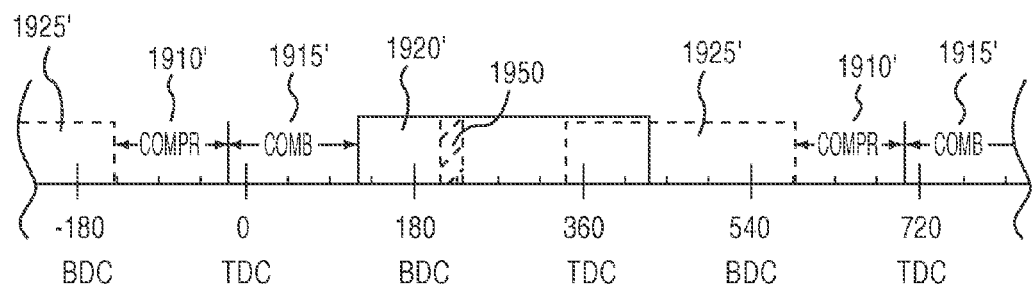
Figure 36:
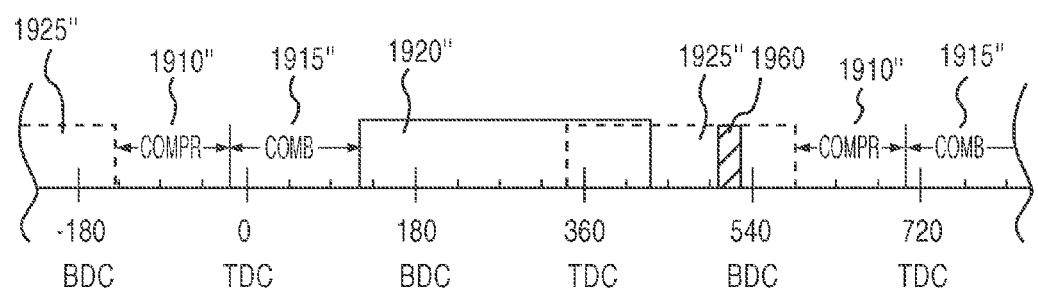

FIGS. 34-36 are graphical representations of the valve events of a cylinder of a multi-cylinder engine operating in a standard four stroke combustion mode, a first exhaust gas recirculation (EGR) mode and a second EGR mode respectively. The longitudinal axes indicate the position of the piston within the cylinder in terms of the rotational position of the crankshaft. For example, the position of 0 degrees occurs when the piston is at top dead center on the firing stroke of the engine, the position of 180 degrees occurs when the piston is at bottom dead center after firing, the position of 360 degrees occurs when the piston is at top dead center on the gas exchange stroke, and so on. The regions bounded by dashed lines represent periods during which an intake valve associated with the cylinder is opened. Similarly, the regions bounded by solid lines represent the periods during which an exhaust valve associated with the cylinder is opened.

As shown in FIG. 34, when the engine is operating in a four stroke combustion mode, the compression event 1910 occurs after the gaseous mixture is drawn into the cylinder. During the compression event 1910, both the intake and exhaust valves are closed as the piston moves upwardly towards TDC, thereby allowing the gaseous mixture contained in the cylinder to be compressed by the motion of the piston. At a suitable point, such as, for example −10 degrees, the combustion event 1915 begins. At a suitable point as the piston moves downwardly, such as, for example, 120 degrees, the exhaust valve open event 1920 begins. In some embodiments, the exhaust valve open event 1920 continues until the piston has reached TDC and has begun moving downwardly. Moreover, as shown in FIG. 34, the intake valve open event 1925 can begin before the exhaust valve open event 1920 ends. In some embodiments, for example, the intake valve open event 1925 can begin at 340 degrees and the exhaust valve open event 1920 can end at 390 degrees, thereby resulting in an overlap duration of 50 degrees. At a suitable point, such as, for example, 600 degrees, the intake valve open event 1925 ends and a new cycle begins.

In some embodiments, a predetermined amount of exhaust gas is conveyed from the exhaust manifold to the intake manifold via an exhaust gas recirculation (EGR) valve. In some embodiments, the EGR valve is controlled to ensure that precise amounts of exhaust gas are conveyed to the intake manifold.

As shown in FIG. 35, when the engine is operating in the first EGR mode, the intake valve associated with the cylinder is configured to convey exhaust gas from the cylinder directly into the intake manifold (not shown in FIG. 35), thereby eliminating the need for a separate EGR valve. As shown, the compression event 1910' occurs after the gaseous mixture is drawn into the cylinder. During the compression event 1910', both the intake and exhaust valves are closed as the piston moves upwardly towards TDC, thereby allowing the gaseous mixture contained in the cylinder to be compressed by the motion of the piston. As described above, at a suitable point, the combustion event 1915' begins. Similarly, at a suitable point the exhaust valve open event 1920' begins. At a suitable point during the exhaust valve event 1920', such as, for example, at 190 degrees, the first intake valve open event 1950 occurs. Because the first intake valve open event 1950 can be configured to occur when the pressure of the exhaust gas within the cylinder is greater than the pressure in the intake manifold, a portion of the exhaust gas will flow from the cylinder into the intake manifold. In this manner, exhaust gas can be conveyed directly into the intake manifold via the intake valve. The amount of exhaust gas flow can be controlled, for example, by varying the duration of the first intake valve open event 1950, adjusting the point at which the first intake valve open event 1950 occurs and/or varying the stroke of the intake valve during the first intake valve open event 1950.

As shown in FIG. 35, the second intake valve open event 1925' can begin before the exhaust valve open event 1920' ends. As described above, at suitable points, the first intake valve open event 1950 ends, the second intake valve open event 1925' ends and a new cycle begins.

As shown in FIG. 36, when the engine is operating in the second EGR mode, the exhaust valve associated with the cylinder is configured to convey exhaust gas from the exhaust manifold (not shown) directly into the cylinder (not shown in FIG. 35), thereby eliminating the need for a separate EGR valve. As shown, the compression event 1910'' occurs after the gaseous mixture is drawn into the cylinder. During the compression event 1910'', both the intake and exhaust valves are closed as the piston moves upwardly towards TDC, thereby allowing the gaseous mixture contained in the cylinder to be compressed by the motion of the piston. As described above, at a suitable point, the combustion event 1915'' begins. Similarly, at a suitable point the first exhaust valve open event 1920'' begins.

As described above, the intake valve open event 1925'' can begin before the first exhaust valve open event 1920'' ends. At a suitable point during the intake valve open event 1925'', such as, for example, at 500 degrees, the second exhaust valve open event 1960 occurs. Because the second exhaust valve open event 1960 can be configured to occur when the pressure of the exhaust gas within the exhaust manifold is greater than the pressure in the cylinder, a portion of the exhaust gas will flow from the exhaust manifold into the cylinder. In this manner, exhaust gas can be conveyed directly into the cylinder via the exhaust valve. The amount of exhaust gas flow into the cylinder can be controlled, for example, by varying the duration of the second exhaust valve open event 1960, adjusting the point at which the second exhaust valve open event 1960 occurs and/or varying the stroke of the exhaust valve during the second exhaust valve open event 1960. As described above, at suitable points, the second exhaust valve open event 1970 ends, the intake valve open event 1925'' ends and a new cycle begins.

Although the valve events are represented as square waves, in other embodiments, the valve events can have any suitable shape. For example, in some embodiments the valve events can be configured to as sinusoidal waves. In this manner, the acceleration of the valve member can be controlled to minimize the likelihood of valve bounce during the opening and/or closing of the valve.

In addition to allowing improvements in engine performance, the arrangement of the valve members shown and described above also results in improvements in the assembly, repair, replacement and/or adjustment of the valve members. For example, as previously discussed with reference to FIG. 5 and as shown in FIG. 37 the end plate 323 is removably coupled to the cylinder head 332 via cap screws 317, thereby allowing access to the spring 318 and the valve member 360 for assembly, repair, replacement and/or adjustment. Because the valve member 360 does not extend below the first surface 335 of the cylinder head (i.e., the valve member 360 does not protrude into the cylinder 303), the valve member 360 can be installed and/or removed without removing the cylinder head assembly 330 from the cylinder 303. Moreover, because the tapered portion 362 of the valve member 360 is disposed within the valve pocket 338 such that the width and/or thickness of the valve member 360 increases away from the camshaft 314 (e.g., in the direction indicated by arrow C in FIG. 5), the valve member 360 can be removed without removing the camshaft 314 and/or any of the linkages (i.e., tappets) that can be disposed between the camshaft 314 and the valve member 360. Additionally, the valve member 360 can be removed without removing the gas manifold 310. For example, in some embodiments, a user can remove the valve member 360 by moving the end plate 323 such that the valve pocket 338 is exposed, removing the spring 318, removing the alignment key 398 from the keyway 399 and sliding the valve member 360 out of the valve pocket 338. Similar procedures can be followed to replace the spring 318, which may be desirable, for example, to adjust the biasing force applied to the first stem portion 377 of the valve member 360.

Similarly, an end plate 322 (see FIG. 5) is removably coupled to the cylinder head 332 to allow access to the camshaft 314 and the first stem portion 376 for assembly, repair and/or adjustment. For example, as discussed in more detail herein, in some embodiments, a valve member can include an adjustable tappet (not shown) configured to provide a predetermined clearance between the valve lobe of the camshaft and the first stem portion when the cylinder head is in the closed configuration. In such arrangements, a user can remove the end plate 322 to access the tappet for adjustment. In other embodiments, the camshaft is disposed within a separate cam box (not shown) that is removably coupled to the cylinder head.

Figure 38:
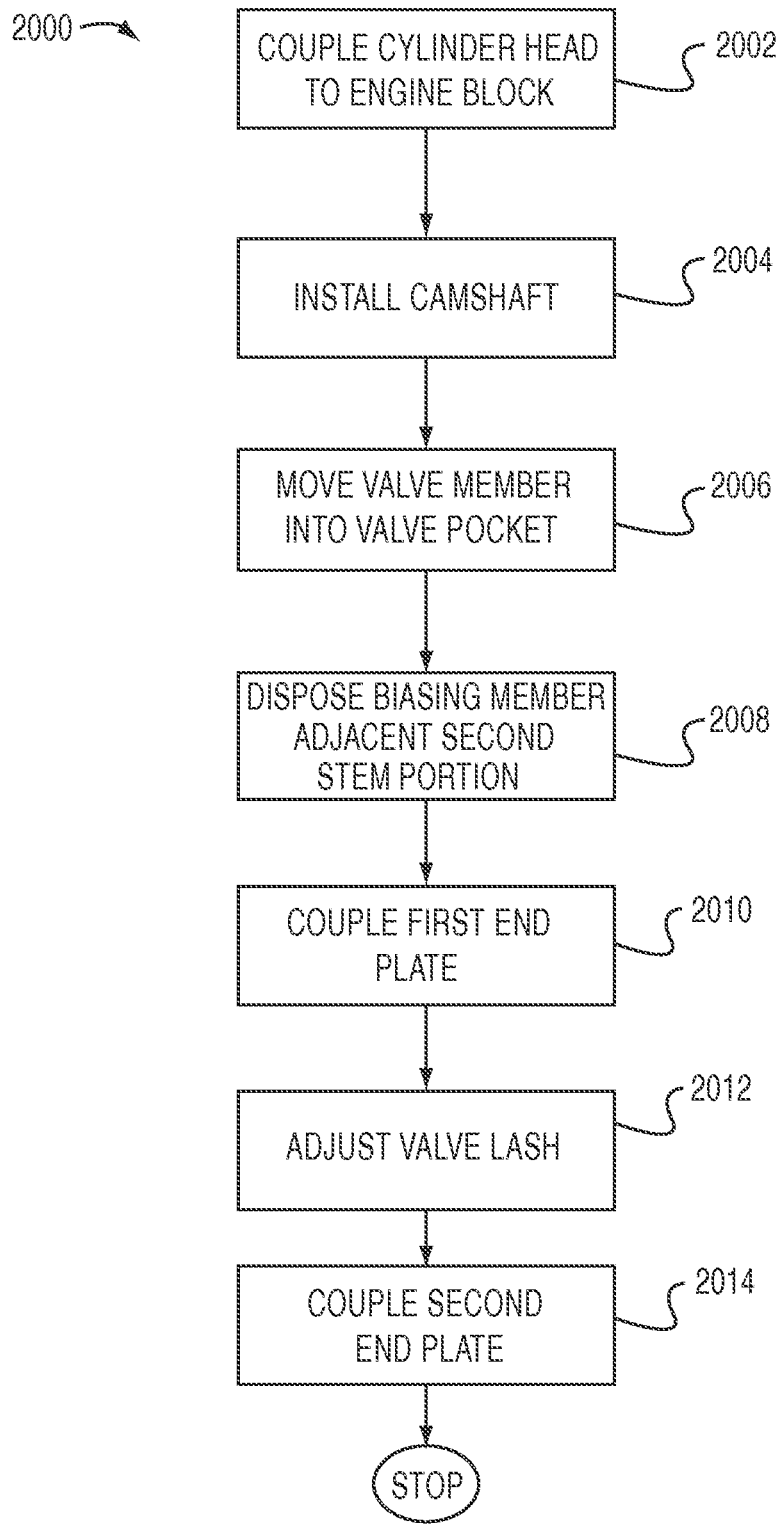
FIG. 38 is a flow chart illustrating a method of assembling an engine according to an embodiment of the invention.

FIG. 38 is a flow chart illustrating a method 2000 for assembling an engine according to an embodiment of the invention. The illustrated method includes coupling a cylinder head to an engine block, 2002. As described above, in some embodiments, the cylinder head can be coupled to the engine block using cylinder head bolts. In other embodiments, the cylinder head and the engine block can be constructed monolithically. In such embodiments, the cylinder head is coupled to the engine block during the casting process. At 2004, a camshaft is then installed into the engine.

The method then includes moving a valve member, of the type shown and described above, into a valve pocket defined by the cylinder head, 2006. As previously discussed, in some embodiments, the valve member can be installed such that a first stem portion of the valve member is adjacent to and engages a valve lobe of the camshaft. Once the valve member is disposed within the valve pocket, a biasing member is disposed adjacent a second stem portion of the valve member, 2008, and a first end plate is coupled to the cylinder head, such that a portion of the biasing member engages the first end plate, 2010. In this manner, the biasing member is retained in place in a partially compressed (i.e., preloaded) configuration. The amount of biasing member preload can be adjusted by adding and/or removing spacers between the first end plate and the biasing member.

Because the biasing member can be configured to have a relatively low preload force, in some embodiments, the first end plate can be coupled to the cylinder head without using a spring compressor. In other embodiments, the cap screws securing the first end plate to the cylinder head can have a predetermined length such that the first end plate can be coupled to the cylinder without using a spring compressor.

The illustrated method then includes adjusting a valve lash setting, 2012. In some embodiments, the valve lash setting is adjusted by adjusting a tappet disposed between the first stem portion of the valve member and the camshaft. In other embodiments, a method does not include adjusting the valve lash setting. The method then includes coupling a second end plate to the cylinder head, 2014, as described above.

Figure 39:
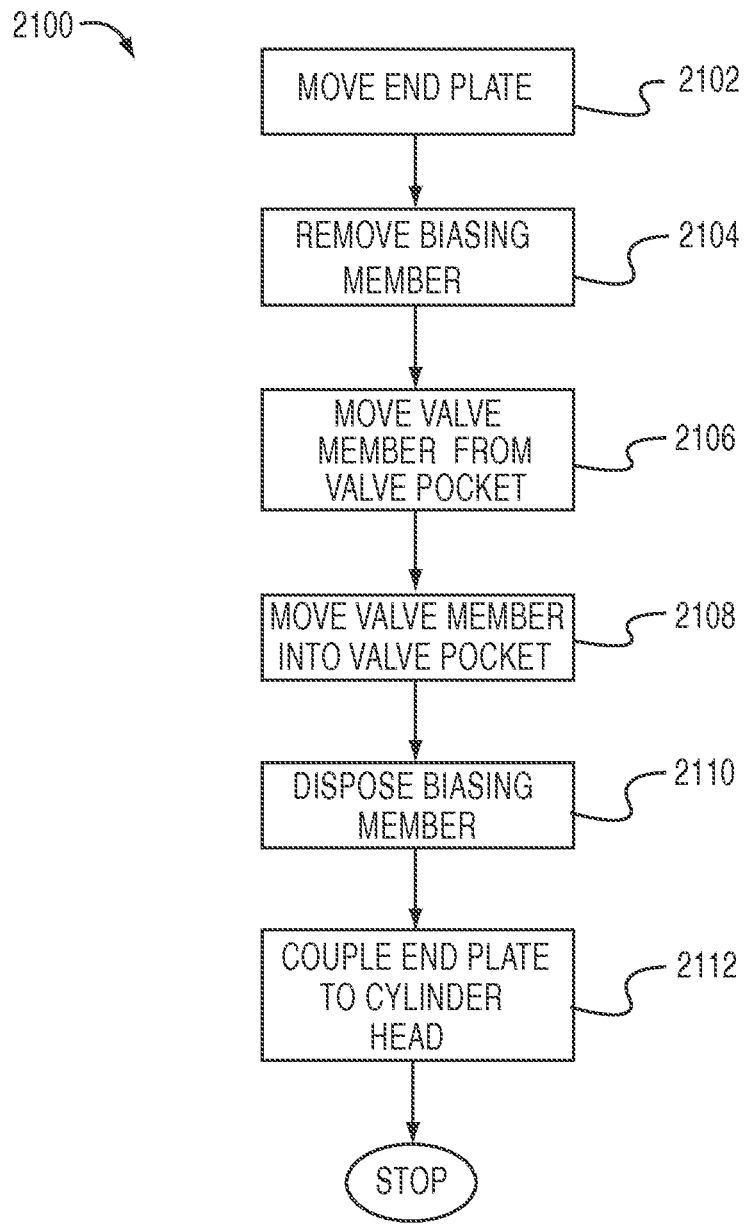
FIG. 39 is a flow chart illustrating a method of repairing an engine according to an embodiment of the invention.

FIG. 39 is a flow chart illustrating a method 2100 for replacing a valve member in an engine without removing the cylinder head according to an embodiment of the invention. The illustrated method includes moving an end plate to expose a first opening of a valve pocket defined by a cylinder head, 2102. In some embodiments, the end plate can be removed from the cylinder head. In other embodiments, the end plate can be loosened and pivoted such that the first opening is exposed. A biasing member, which is disposed between a second end portion of the valve member and the end plate, is removed, 2104. In this manner, the second end portion of the valve member is exposed. The valve member is then moved from within the valve pocket through the first opening, 2106. In some embodiments, the camshaft can be rotated to assist in moving the valve member through the first opening. A replacement valve member is disposed within the valve pocket, 2108. The biasing member is then replaced, 2110, and the end plate is coupled to the cylinder head 2112, as described above.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
actuating an actuator at a first time to move a valve within a cylinder head of an internal combustion engine from a closed position to a first open position, the valve including a tapered portion defining a plurality of valve flow passages being in fluid communication with a cylinder and a gas manifold when the valve is in the first open position;
varying a stroke of the valve to establish a second open position different than the first open position; and
actuating the actuator at a second time to move the valve within the cylinder head of the internal combustion engine from the closed position to the second open position, the plurality of valve flow passages being in fluid communication with the cylinder and the gas manifold when the valve is in the second open position.

2. The method of claim 1, wherein:
a first gas flows between the gas manifold and the cylinder at a first flow rate when the valve is in the first open position; and
a second gas flows between the gas manifold and the cylinder at a second flow rate different than the first flow rate when the valve is in the first open position.

3. The method of claim 1, wherein the actuator is a pneumatic actuator.

4. The method of claim 1, wherein actuating the actuator includes energizing a solenoid.

5. The method of claim 1, wherein a distance between the closed position and the first open position is greater than a distance between the closed position and the second open positions.

6. The method of claim 1, wherein a portion of the cylinder head is disposed between the valve and a combustion chamber of the internal combustion engine.

7. The method of claim 1, wherein the valve is configured to move independently of a crankshaft of the internal combustion engine.

8. An apparatus, comprising:
a valve having a portion movably disposed within a valve pocket defined by a cylinder head of an engine, the portion of the valve defining a flow opening, the valve configured to move relative to the cylinder head a distance between a closed position and an opened position, the valve and the cylinder head collectively configured such that a gas can flow between a manifold and a cylinder of the engine via the flow opening when the valve is in the opened position; and
an actuation assembly including a first actuator and a second actuator, the actuation assembly configured to engage the valve to move the valve between the open position and the closed position, the actuation assembly configured to vary the distance between the open position and the closed position.

9. The apparatus of claim 8, wherein
the gas flows between a manifold and a cylinder of an engine via the flow opening at a first flow rate when the distance is a first value; and
the gas flows between a manifold and a cylinder of an engine via the flow opening at a second flow rate when the distance is a second value, the second flow rate different from the first flow rate.

10. The apparatus of claim 8, wherein the portion of the valve is tapered.

11. The apparatus of claim 8, wherein at least one of the first actuator and the second actuator is pneumatic.

12. The apparatus of claim 8, wherein the actuation assembly is configured to engage the valve in response to the actuation of a solenoid.

13. The apparatus of claim 8, wherein the flow opening is a first flow opening, the valve defining a second flow opening.

14. An apparatus, comprising:
a valve having a portion movably disposed within a valve pocket defined by a cylinder head of an engine, the portion of the valve defining a plurality of flow passages, the valve configured to move within the valve pocket a distance between a closed position and an opened position, a manifold of the engine being in fluid communication with a cylinder of the engine via the plurality of flow passages when the valve is in the opened position; and
an actuation assembly including a first actuator and a second actuator, the actuation assembly configured to move the valve between the open position and the closed position, the actuation assembly configured to vary a flow rate of a gas through the plurality of flow passages when the valve is in the opened positioned.

15. The apparatus of claim 14, wherein the actuation assembly is configured to vary the distance between the closed position and the opened position.

16. The apparatus of claim 14, wherein the portion of the valve is tapered.

17. The apparatus of claim 14, wherein at least one of the first actuator and the second actuator is pneumatic.

18. The apparatus of claim 14, wherein the valve is configured to move independently of a crankshaft of the internal combustion engine.

* * * * *